US008595998B2

(12) United States Patent
Isaacs

(10) Patent No.: US 8,595,998 B2
(45) Date of Patent: *Dec. 3, 2013

(54) GEOSOLAR TEMPERATURE CONTROL CONSTRUCTION AND METHOD THEREOF

(71) Applicant: GS Research LLC, Bay St. Louis, MS (US)

(72) Inventor: Mark Isaacs, Waveland, MS (US)

(73) Assignee: GE Research LLC, Bay St. Louis, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,644

(22) Filed: Nov. 12, 2012

(65) Prior Publication Data

US 2013/0061847 A1    Mar. 14, 2013

Related U.S. Application Data

(63) Continuation-in-part of application No. 12/608,473, filed on Oct. 29, 2009, now Pat. No. 8,322,092.

(51) Int. Cl.
*E04C 2/52* (2006.01)
(52) U.S. Cl.
USPC .............. 52/220.1; 165/48.2; 165/45; 165/10; 165/49; 237/69; 62/260
(58) Field of Classification Search
USPC .............. 52/220.1; 165/48.1, 48.2, 45, 10, 49, 165/56; 237/69; 62/260
See application file for complete search history.

(56) References Cited

U.S. PATENT DOCUMENTS

| 1,640,065 | A |   | 8/1927 | Blaw |
| 2,645,928 | A |   | 7/1953 | Roos |
| 2,743,602 | A |   | 5/1956 | Dunn |
| 4,000,851 | A |   | 1/1977 | Heilemann |
| 4,062,489 | A |   | 12/1977 | Henderson |
| 4,069,973 | A |   | 1/1978 | Edwards |
| 4,075,799 | A |   | 2/1978 | Lemelson |
| 4,089,142 | A | * | 5/1978 | Kachadorian ........... 237/1 R |
| 4,095,584 | A | * | 6/1978 | Pies ........................... 126/620 |
| 4,127,973 | A |   | 12/1978 | Kachadorian |
| 4,227,566 | A |   | 10/1980 | Stilber |
| 4,231,351 | A |   | 11/1980 | Pheils, Jr. |
| 4,250,670 | A |   | 2/1981 | Garner |
| 4,289,115 | A |   | 9/1981 | O'Hanlon |
| 4,306,395 | A |   | 12/1981 | Carpenter |

(Continued)

FOREIGN PATENT DOCUMENTS

DE  3237317   4/1984
JP  06129715  5/1994

(Continued)

OTHER PUBLICATIONS

Korean Intellectual Property Office, The International Search Report and the Written Opinion of the International Searching Authority, or the Declaration, Search Report and Written Opinion, Jul. 1, 2011, pp. 1-9, Korean Intellectual Property Office, Republic of Korea.

*Primary Examiner* — Chi Q Nguyen
(74) *Attorney, Agent, or Firm* — Middleton Reutlinger; James E. Cole

(57) ABSTRACT

A structure and method of controlling building temperature are provided utilizing both solar and geo-exchange means.

27 Claims, 25 Drawing Sheets

(56) References Cited

U.S. PATENT DOCUMENTS

| | | |
|---|---|---|
| 4,335,548 A | 6/1982 | Rehbein |
| 4,375,831 A | 3/1983 | Downing, Jr. |
| 4,439,959 A | 4/1984 | Helfman |
| 4,523,519 A | 6/1985 | Johnson |
| 4,557,084 A | 12/1985 | Dumbeck |
| 4,607,791 A | 8/1986 | Gantner |
| 4,653,241 A | 3/1987 | Bindi |
| 4,842,048 A | 6/1989 | Higaki |
| 4,967,729 A | 11/1990 | Okumura |
| 4,998,393 A | 3/1991 | Baena |
| 5,054,252 A | 10/1991 | Newman |
| 5,433,049 A | 7/1995 | Karlsson et al. |
| 5,934,036 A | 8/1999 | Gallagher, Jr. |
| 5,941,238 A | 8/1999 | Tracy |
| 5,957,378 A | 9/1999 | Fiedrich |
| 6,009,612 A | 1/2000 | Fiedrich et al. |
| 6,220,339 B1 | 4/2001 | Krecke |
| 6,293,120 B1 | 9/2001 | Hashimoto |
| 6,557,774 B1 | 5/2003 | Krueger |
| 6,568,136 B2 | 5/2003 | Aso |
| 6,619,557 B1 | 9/2003 | Bonura et al. |
| 6,718,722 B2 | 4/2004 | Worrell et al. |
| 6,810,945 B1 | 11/2004 | Boissevain |
| 6,886,303 B2 | 5/2005 | Schmidt |
| 7,028,685 B1 | 4/2006 | Krecke |
| 7,032,649 B2 | 4/2006 | Schulak |
| 7,187,854 B2 | 3/2007 | Sauvageau et al. |
| 7,234,314 B1 | 6/2007 | Wiggs |
| 7,261,145 B2 | 8/2007 | Ichiyama et al. |
| 7,337,838 B2 | 3/2008 | Platell |
| 7,377,122 B2 | 5/2008 | Kidwell et al. |
| 7,407,004 B2 | 8/2008 | Kugemoto |
| 7,410,104 B2 | 8/2008 | MacPherson |
| 7,571,762 B2 * | 8/2009 | Ross ............................ 165/295 |
| 7,617,697 B2 | 11/2009 | McCaughan |
| 7,658,222 B2 | 2/2010 | Rudnicki |
| 7,789,740 B2 | 9/2010 | Janesky |
| 8,322,092 B2 * | 12/2012 | Isaacs .......................... 52/220.1 |
| 2002/0117596 A1 | 8/2002 | McCracken |
| 2003/0121641 A1 | 7/2003 | Schulak et al. |
| 2004/0003550 A1 | 1/2004 | Konopka |
| 2005/0281547 A1 | 12/2005 | Sauvageau et al. |
| 2006/0213637 A1 | 9/2006 | Laroche |
| 2007/0039715 A1 | 2/2007 | Brett |
| 2007/0051492 A1 | 3/2007 | Ross |
| 2007/0144093 A1 | 6/2007 | Messenger et al. |
| 2007/0151704 A1 * | 7/2007 | Elmore ......................... 165/45 |
| 2007/0199266 A1 | 8/2007 | Geilen |
| 2007/0240847 A1 | 10/2007 | Rudnicki |
| 2007/0257124 A1 * | 11/2007 | Bates ............................ 237/69 |
| 2008/0010736 A1 * | 1/2008 | Hubbard et al. ................. 4/493 |
| 2008/0028719 A1 | 2/2008 | Rutledge |
| 2008/0060786 A1 | 3/2008 | Warnelov et al. |
| 2008/0111034 A1 | 5/2008 | MacDuff |
| 2008/0149301 A1 | 6/2008 | Jatkar |
| 2008/0185122 A1 * | 8/2008 | Kidwell et al. ................. 165/45 |
| 2008/0209933 A1 | 9/2008 | Kidwell et al. |
| 2008/0230205 A1 * | 9/2008 | Seguin et al. .................. 165/45 |
| 2008/0236784 A1 | 10/2008 | Liebel |
| 2009/0001185 A1 * | 1/2009 | Kroll et al. ..................... 237/60 |
| 2009/0049763 A1 | 2/2009 | Blundell et al. |
| 2009/0084518 A1 * | 4/2009 | Panula et al. .................. 165/45 |
| 2009/0084519 A1 * | 4/2009 | Panula et al. .................. 165/45 |

FOREIGN PATENT DOCUMENTS

| | | |
|---|---|---|
| JP | 2000314535 | 11/2000 |
| JP | 2003013511 | 1/2003 |
| JP | 2005241041 | 9/2005 |
| JP | 2005147643 | 6/2006 |
| JP | 2006152670 | 6/2006 |
| JP | 2007183023 | 7/2007 |
| JP | 2008121960 A | 5/2008 |

* cited by examiner

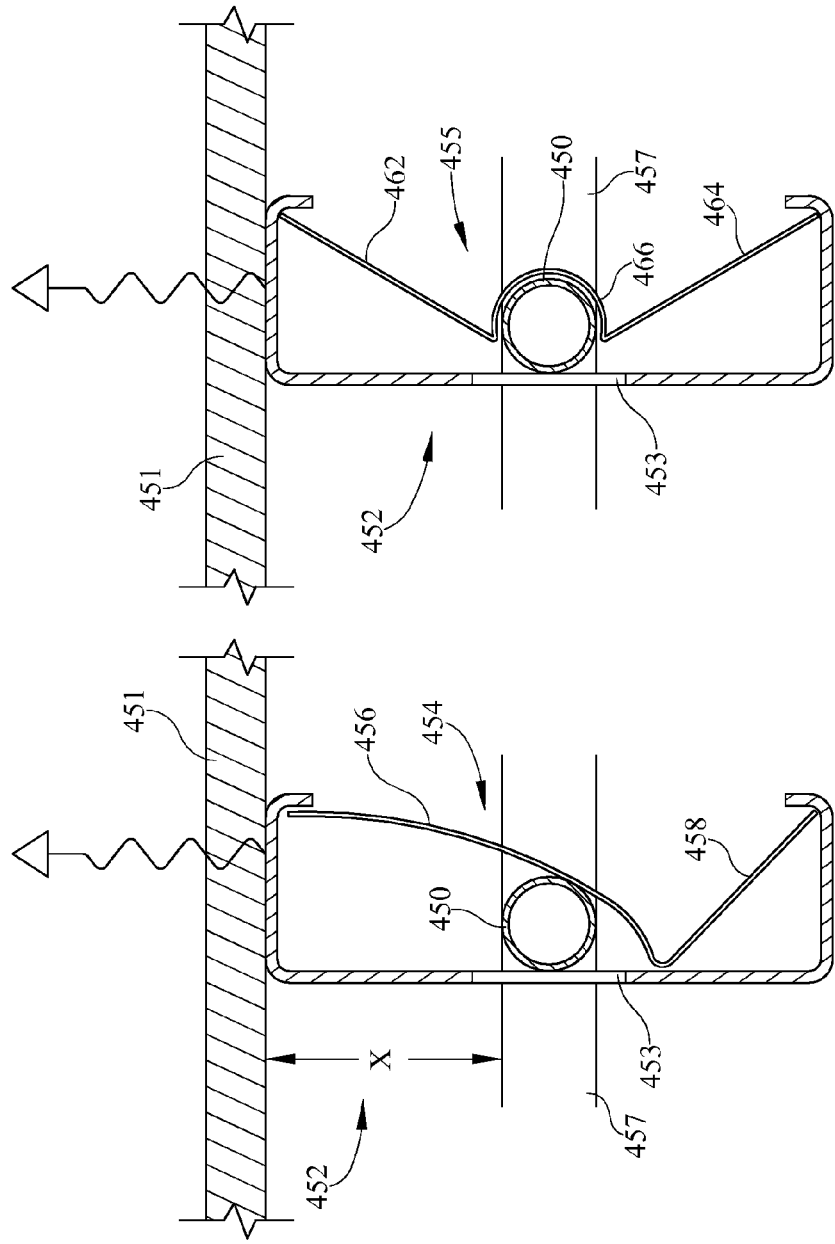

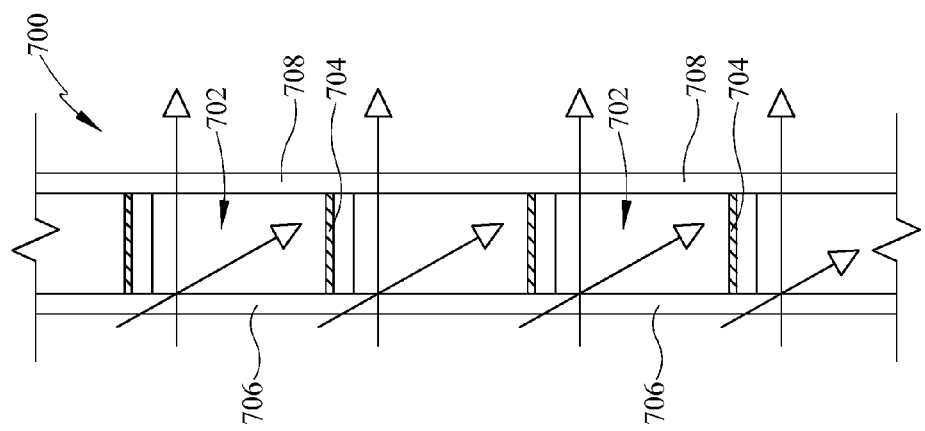
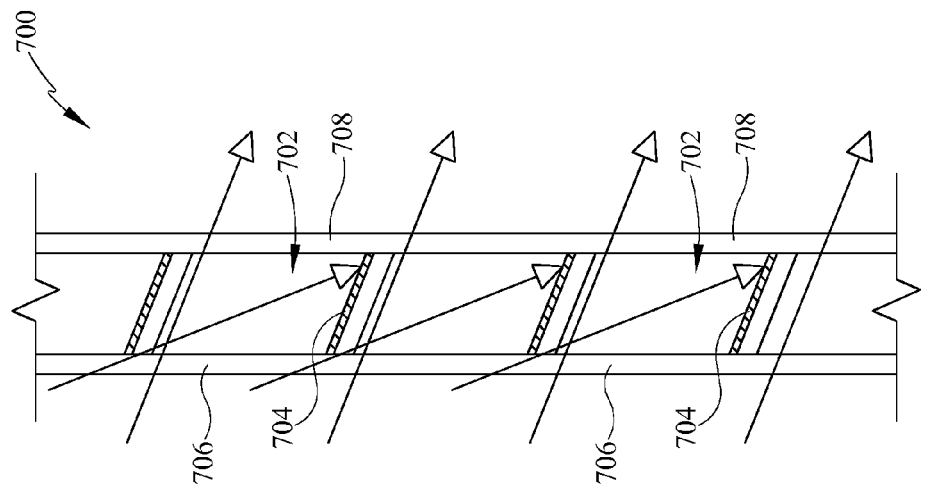
FIG. 26

GEOSOLAR TEMPERATURE CONTROL CONSTRUCTION AND METHOD THEREOF

CROSS-REFERENCE TO RELATED APPLICATION

This application is a continuation-in-part application and claims priority to and benefit from, under 35 U.S.C. §120, co-pending U.S. patent application Ser. No. 12/608,473, filed Oct. 29, 2009, the contents of which are incorporated by reference herein.

SUBJECT TO GRANT FILED WITH FEDERAL GOVERNMENT

None.

TECHNICAL FIELD

The present invention relates generally to geosolar temperature control construction for buildings. More specifically, the present invention relates to a construction for and method of controlling building temperature by using both geo-exchange and solar means.

BACKGROUND

With the increase in "green" building goals and a desire to increase energy savings and conserve natural resources, it has become very desirable to examine new construction techniques and methods of meeting the goals of energy conservation and improved use of non-renewable resources. One desire is to provide near or net zero energy buildings where the annual energy to maintain comfort within the building envelope is met onsite through renewable resources.

Additionally, it is highly desirable to effect improvements in climate change which is regarded as a priority of countries around the globe. Reducing usage of fossil fuels leads to decreases in greenhouse gas production in order to avoid potential negative impacts of climate change.

It is also desirable to develop a clean and cost-effective path to a secure energy future, resulting in increased green job creation.

SUMMARY

A geosolar temperature control building construction system wherein a concrete, steel or wood frame wall defines a temperature delivery system, comprising the concrete wall having insulation on at least an outer surface, the concrete wall structure positioned at a first elevation in the earth, the first elevation being below a frost line for a region where the building construction is located, a passive thermal transfer system comprising an inwardly facing surface of the concrete wall having insulation removed at the first elevation to expose the concrete wall to thermal conditions at the first elevation and thermally couple the building to the earth, the concrete wall defining an exterior wall of the building construction generally near a floor slab, the floor slab positioned at a second elevation of the concrete wall above the first elevation, an active thermal transfer system comprising a closed loop piping system having a plurality of a horizontally extending pipes disposed beneath the floor slab, the plurality of horizontally extending pipes further extending upwardly through the insulated concrete wall, a first thermal transfer liquid passing through the closed loop piping system, the first thermal transfer fluid receiving thermal energy in the horizontally extending pipes beneath the slab from at least one temperature controlled zone and actively transferring the thermal energy to the exterior walls, at least one window in the exterior wall, the exterior wall having a plurality of exposed surfaces on an inside of the exterior wall, the closed loop piping of the active thermal transfer system disposed adjacent the exposed surfaces to transfer thermal energy into or out of the building and control interior building temperature, and, a geosolar thermal transfer system comprising a solar collector and at least one vertically extending solar recharge loop, the geosolar thermal transfer system receiving solar energy for storage in the earth beneath the building construction or discharging thermal energy from the ground to atmosphere to create the at least one temperature controlled zone beneath the building construction. The geosolar temperature control building construction further comprising a plurality of temperature controlled zones beneath the building construction. The geosolar temperature control building construction wherein one of the plurality of temperature controlled zones is a comfort zone having a temperature of between about 50 degrees and 90 degrees. The geosolar temperature control building construction wherein the closed loop piping of the active thermal transfer system extends along a roof of the building. The geosolar temperature control building construction wherein the geosolar thermal transfer system discharges thermal energy from the earth in the area adjacent the recharge loop in winter. The geosolar temperature control building construction wherein the geosolar thermal transfer system charges thermal energy in the earth in the area adjacent the recharge loop in summer. The geosolar temperature control building construction wherein the insulated concrete wall is formed of one of cast-in-place concrete, pre-cast concrete, core-filled concrete block, or insulated concrete form.

According to certain embodiments, a geosolar temperature control building construction comprises an insulated concrete wall having a lower portion below grade elevation and an upper portion above the grade elevation, with the lower portion set a certain distance below a frost line for a location of the building, and the insulated concrete wall defining a portion of a building envelope, a floor slab disposed near grade elevation and adjacent to the insulated concrete wall at the inside of the wall, the lower portion having an inwardly facing surface with the insulation removed defining exposed concrete at a depth below the grade elevation, the exposed concrete coupled to a temperature zone and passively transferring thermal energy at a desired temperature to the building envelope to buffer ambient temperature conditions, an active thermal transfer system comprising piping disposed within the upper portion of the insulated concrete wall having a first thermal transfer fluid therein, a geosolar thermal transfer system comprising at least one horizontally extending pipe beneath the floor slab, the at least one horizontally extending pipe in fluid communication with the active thermal transfer system, the active thermal transfer system having at least one pipe on a side of a window jamb so that the concrete wall at at least one of said jamb, a sill or other interior surface of the exterior wall are thermally coupled to the building interior and deliver heat to or cool the building interior to maintain interior thermal comfort, the geosolar thermal transfer system further comprising a solar collector to charge or discharge thermal energy from a second thermal transfer fluid, the second thermal transfer fluid capable of being mixed with the first thermal transfer fluid to control temperature within the building envelope. The geosolar temperature control building construction wherein the at least one horizontal pipe of the geosolar thermal transfer system beneath the floor slab creates temperature zones beneath the building and the piping of the active thermal transfer system receives the thermal energy within the temperature zone by passing the first thermal transfer fluid therethrough. The geosolar temperature control building construction wherein the geosolar thermal transfer system capable of storing thermal energy in or discharging thermal energy from the earth beneath the building construction. The geosolar temperature control building construction wherein the stored thermal energy capable of being harvested for building warming. The geosolar temperature control building construction wherein the discharged thermal energy creates areas of decreased temperature which may be harvested for building cooling.

According to some embodiments a geosolar temperature control building wherein an insulated concrete wall defines a temperature delivery system, comprises a building envelope defined by an insulated concrete wall having an upper exterior portion generally above grade and an insulated foundation portion generally below grade, the insulated concrete foundation portion extending below a frost line for a location of the building and having an inwardly facing surface being exposed to transfer thermal energy with the earth at a depth below the frost line, the insulated concrete foundation portion defining a thermal exchange and storage area in the earth below the building which define a plurality of temperature zones, an active thermal transfer system having a first thermal transfer fluid and a plurality of pipes extending upwardly into the building envelope and a plurality of distribution loops extending substantially vertically into the earth and beneath the building, a geosolar thermal transfer system having a second thermal transfer fluid and a plurality of recharge loops extending substantially vertically into the ground, the recharge loops charging or discharging the earth with thermal energy, the plurality of distribution loops absorbing or discharging the thermal energy and passing the first thermal transfer fluid into the building envelope, the exterior wall having a plurality of windows, at least one exposed wall surface on an interior of the building, at least one of the plurality of pipes disposed within the upper exterior portion of the building, the exposed wall surface radiating or absorbing thermal energy transferred from the at least one of the plurality of pipes to control interior building temperature; and, the geosolar thermal transfer system further comprising a solar collector for collection of solar energy or discharge of thermal energy, the solar collector in thermal communication with the second thermal transfer fluid and the plurality of recharge loops. The geosolar temperature control building wherein the plurality of distribution loops and the plurality of recharge loops are substantially vertically oriented beneath said floor slab. The geosolar temperature control building wherein the plurality of recharge loops are surrounded by the plurality of distribution loops. The geosolar temperature control building wherein the first thermal transfer fluid is separate from the second thermal transfer fluid.

According to some embodiments, a method of controlling building temperature utilizing the building walls, comprising the steps of storing energy in a thermal exchange area in the earth beneath a building, the thermal exchange area defined by an insulated concrete foundation wall set at a level lower than standard foundation frost lines, thermally coupling and passively transferring thermal energy between the building foundation wall and the thermal exchange area by removing insulation from the inside surface of a lower portion of the insulated concrete foundation wall and also passively transferring thermal energy between the thermal exchange area and an uninsulated floor slab, actively transferring the thermal energy from the thermal exchange area upwardly through one or more pipes in a building exterior wall, transferring the thermal energy through the building exterior walls to surfaces exposed to an interior space, adjacent at least one of windows or doors in said exterior wall, radiating or absorbing the thermal energy through the exposed surfaces to maintain interior thermal comfort, and, charging thermal energy into the thermal exchange area by collection of solar energy, or discharging thermal energy from the thermal exchange area via night sky radiation, whereby the building envelope becomes the temperature delivery system.

According to some embodiments, a geosolar temperature control building construction system wherein a wall defines a temperature delivery system comprises a building envelope including a wall formed of at least one of concrete, metal or wood, the envelope including a footer positioned beneath the building and at least one foundation wall extending from the footer to an upper elevation, the building envelope further extending from the upper elevation of the foundation wall, the concrete foundation wall having insulation on at least an outwardly facing surface, the concrete wall having a first portion positioned at a first elevation relative to the earth, the first elevation being below a grade where the building construction is located, an insulated perimeter having a first portion extending from one of the concrete foundation wall and the footer, the first portion perimeter extending downward and having a horizontal component extending a preselected distance and having a vertical component extending a preselected distance, the insulated perimeter further comprising a vertical portion extending downward a preselected distance providing thermal isolation between a temperature controlled zone beneath the building and ground outside the insulated perimeter, an active thermal transfer system comprising a closed loop piping system having at least a plurality of horizontally extending pipes disposed beneath the floor slab, the plurality of horizontally extending pipes further extending upwardly along the envelope formed of said one of concrete, metal or wood, a first thermal transfer liquid passing through said closed loop piping system, said first thermal transfer fluid receiving thermal energy in the horizontally extending pipes beneath said slab from at least one temperature controlled zone and actively transferring the thermal energy through said building envelope to an interior of the building, the wall having a plurality of uninsulated surfaces adjacent an inside surface of the wall within the building, the closed loop piping of the active thermal transfer system disposed adjacent the uninsulated surfaces to transfer thermal energy into or out of the building and control interior building temperature, and, a geosolar thermal transfer system comprising a solar collector and at least one solar recharge loop, the geosolar thermal transfer system one of: (a) receiving solar energy for storage in the earth beneath a lowermost floor of the building downward and within a perimeter of the insulated perimeter or (b) discharging thermal energy from the ground to atmosphere to create the at least one temperature controlled zone in the earth beneath a lowermost position of the building and downward and within a perimeter of the insulated perimeter. The geosolar temperature control building construction wherein the closed loop piping of the active thermal transfer system extends along a roof of the building. The geosolar temperature control building construction further comprises a plurality of temperature controlled zones beneath the building construction. The geosolar temperature control building construction wherein a first of the plurality of zones is vertically above a second of the plurality of zones. The geosolar temperature control building construction wherein the first zone is a heating zone and the second zone is a cooling zone. The geosolar temperature control building construction wherein the cooling zone is at least partially below an elevation of a groundwater table. The geosolar temperature control building construction further comprises a vertical divider to define horizontally opposed zones of heating and cooling. The geosolar temperature control building construction further comprises vertically opposed zones of heating and cooling. The geosolar temperature control building construction wherein the geosolar thermal transfer system discharges thermal energy from the earth in the area adjacent the recharge loop at least in the winter season. The geosolar temperature control building construction wherein the geosolar thermal transfer system charges thermal energy in the earth in the area adjacent the recharge loop at least in the summer season. The geosolar temperature control building construction wherein the insulated perimeter is formed of insulation board. The geosolar temperature control building construction wherein a first portion of the insulated perimeter is angled downwardly wherein the horizontal component is greater than a vertical component. The geosolar temperature control building construction wherein a first portion is horizontal. The geosolar temperature control building construction wherein a second portion is oriented vertically or angled downwardly. The geosolar temperature control building construction wherein the wall includes one of a single stud or double stud construction. The geosolar temperature control building construction wherein the one of a single or double stud construction is one of metal or wood. The geosolar temperature control building construction further comprises clips for spacing the closed loop piping from the wall. The geosolar temperature control building construction further comprises a spring within the clip to bias the closed loop piping. The geosolar temperature control building construction further comprises a radiant plate along an inner surface of the wall and in thermal communication with the closed loop piping. The geosolar temperature control building construction wherein the closed loop piping is at least partially exposed within an interior of said building. The geosolar temperature control building construction wherein the closed loop piping is a serpentine arrangement on an outer surface of a roof. The geosolar temperature control building construction wherein the closed loop piping is embedded within a roof line assembly. The geosolar temperature control building construction further comprises a passive thermal transfer system comprising an inwardly facing surface of the concrete wall being free of insulation at the first elevation to expose the concrete wall to thermal conditions at the first elevation and thermally couple the building to the earth. The geosolar temperature control building construction further comprises a thermosiphoning solar collector. The geosolar temperature control building construction wherein the closed loop piping is disposed behind the thermosiphoning solar collector. The geosolar temperature control building construction wherein the closed loop piping is formed in the thermosiphoning solar collector.

According to some embodiments, a thermosiphoning solar collector comprises a self-shading glazing system comprised of at least a first layer of polycarbonate and at least a second layer of polycarbonate, a reflective material extending between the at least first and second layers and defining a plurality of cells, the reflective material being at a perpendicular or non-perpendicular angle to the polycarbonate layers.

According to still other embodiments, a method of controlling building temperature utilizing the building walls, comprising the steps of storing energy in a thermal exchange area in the earth beneath a building, the thermal exchange area defined by an insulated concrete foundation wall set at a level lower than standard foundation frost lines, thermally coupling and passively transferring thermal energy between the building foundation wall and the thermal exchange area by removing insulation from the inside surface of a lower portion of the insulated concrete foundation wall and also passively transferring thermal energy between the thermal exchange area and an uninsulated floor slab, actively transferring the thermal energy from the thermal exchange area upwardly through one or more pipes in a building exterior wall, transferring the thermal energy through the building exterior walls to surfaces thermally coupled to an interior space, adjacent at least one of windows or doors in the exterior wall, radiating or absorbing the thermal energy through the exposed surfaces to maintain interior thermal comfort; and, charging thermal energy into the thermal exchange area by collection of solar energy, or discharging thermal energy from the thermal exchange area via night sky radiation, whereby the building envelope becomes the temperature delivery system.

BRIEF DESCRIPTION OF THE ILLUSTRATIONS

In order that the invention may be better understood, embodiments of the Geosolar Temperature Control Construction and Method thereof in accordance with the present invention will now be described by way of examples. These embodiments are not to limit the scope of the present invention as other embodiments of the Construction and Method of the present invention will become apparent to one having ordinary skill in the art upon reading the instant description. Examples of the present invention are shown in figures wherein:

FIG. 17 is a top section view of an exemplary clip with a first spring type;

FIG. 18 is a top section view of an exemplary clip with a second spring type;

FIG. 26 is a side section view of a self-shading glazing for use with the exemplary solar collection system of FIG. 25.

DETAILED DESCRIPTION

Figure 1:
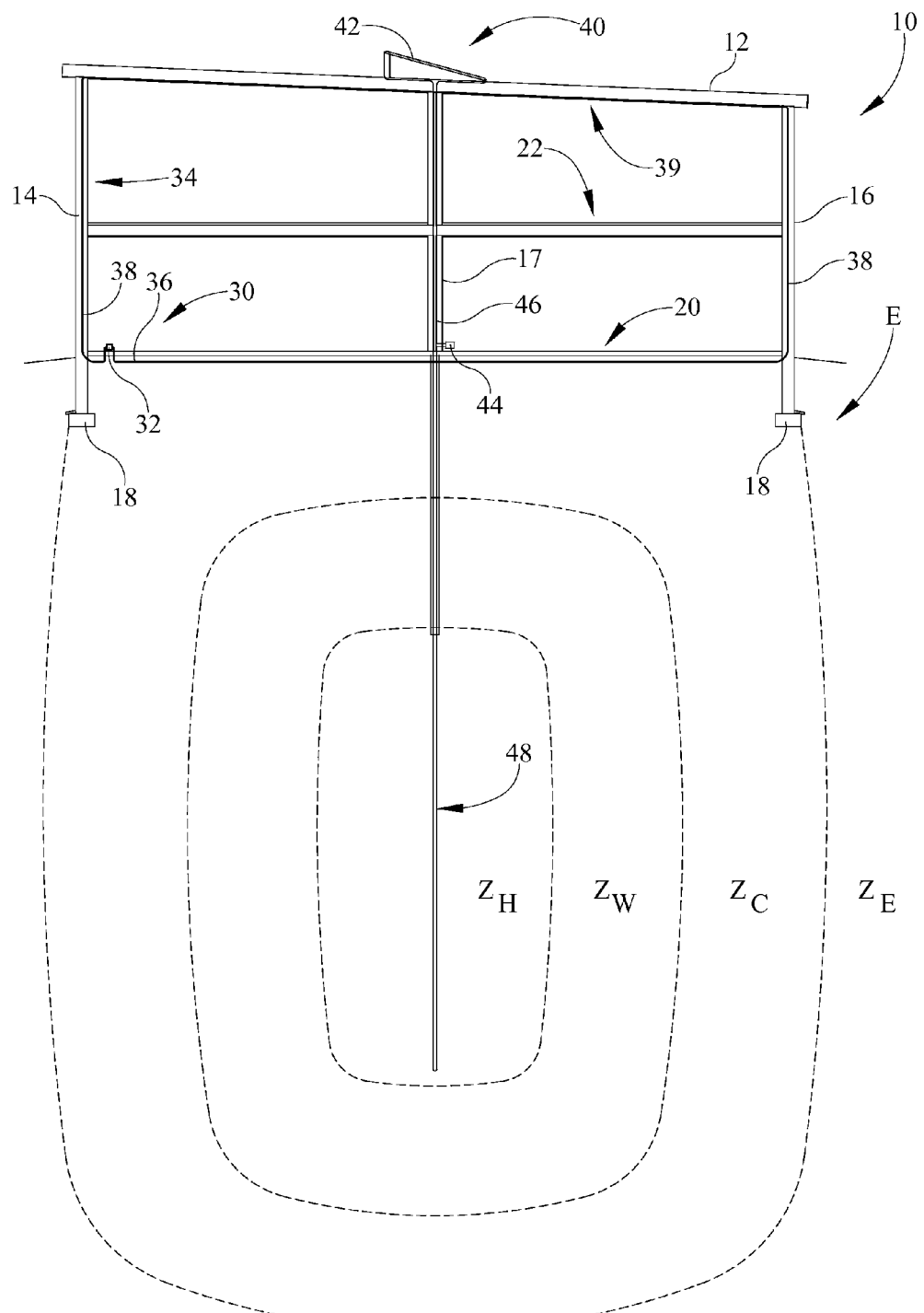
FIG. 1 is a view of a building section of one embodiment of an exemplary geosolar building construction.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As shown in the various FIGS. 1-26, a geosolar building construction is depicted. The geosolar construction utilizes the more constant temperature of the earth and a thermal exchange and storage area beneath the building to passively transfer energy to the building via contact with the slab and coupling with portions of the foundation walls. The geosolar construction also actively transfers energy from the thermal exchange and storage area by pumping thermal energy transfer fluid through pipes extending from the earth into the exterior walls of the building to either remove or gain thermal energy. Additionally, solar energy is utilized to create temperature zones within the one or more thermal exchange and storage areas beneath the building. These zones are used by the passive and active thermal transfer systems to create comfortable indoor temperatures. In combination, the geosolar temperature control construction yields the potential of practical near and net zero energy buildings where the annual energy to maintain comfort within the building envelope is met on-site through renewable resources and the temperature stabilizing mass of the ground enclosed by the building foundation. Greater thermal comfort is made possible by way of the temperature buffering qualities of the earth-coupled building mass that yields Mean Radiant Temperatures (MRT) along the inside of exterior walls, floors and ceilings to maintain year-round comfort.

Figure 2:
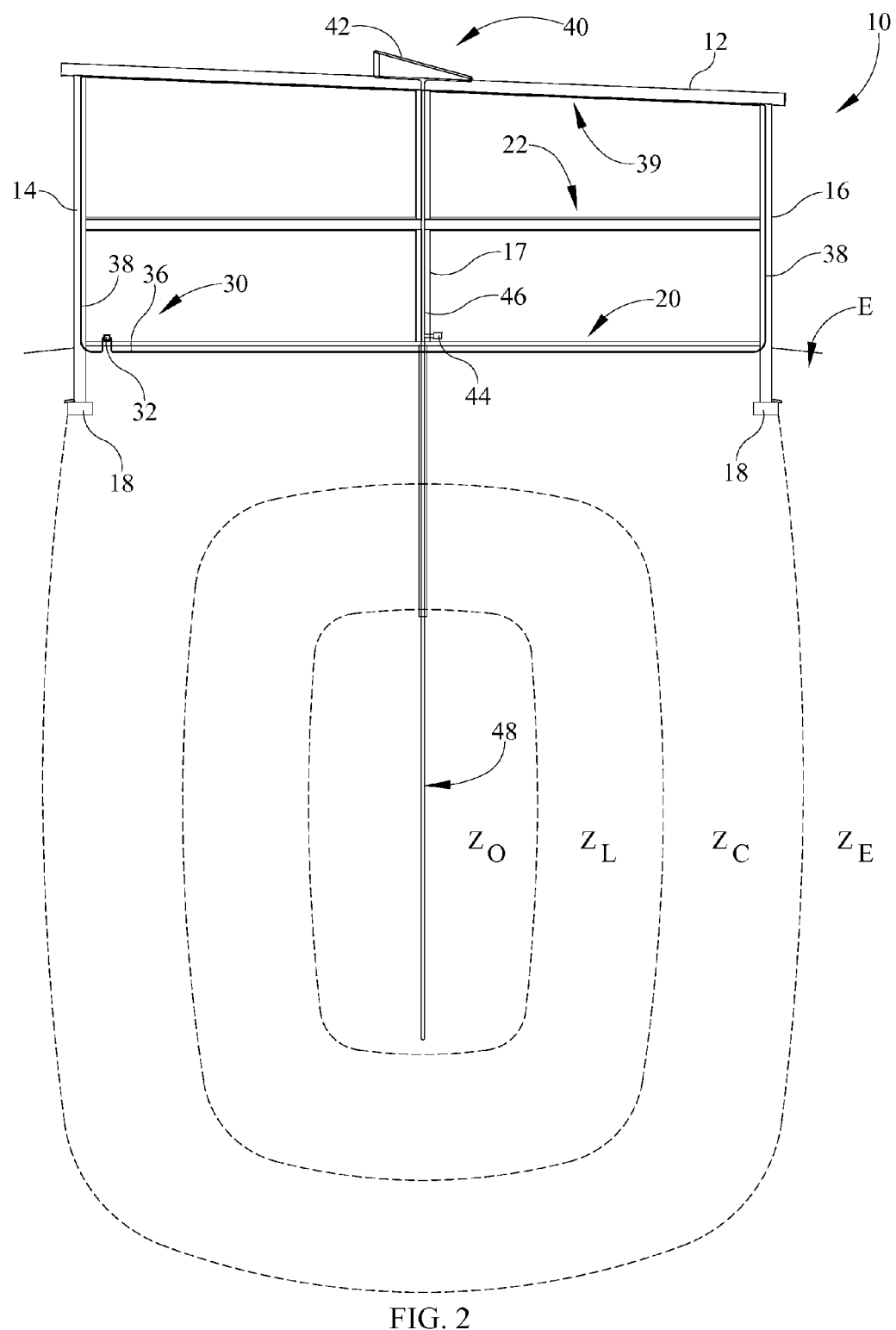
FIG. 2 is a view of the construction of FIG. 1 depicting the differing temperature zones when the system operates in an opposite season from FIG. 1.

Referring now to FIG. 1, a building section view of a first embodiment of the geosolar building construction 10 is depicted. The construction provides for both passive and active thermal transfer as well as charging and discharge by geosolar means. It should be briefly noted that although FIGS. 1 and 2 are section views, any cross-hatching indicative of a section cut has been removed for sake of clarity of the systems and components depicted. The section view of building 10 depicts a roof 12 which may be formed of concrete or other materials and also includes some amount of insulation between the exterior roof surface and the interior of the building 10. For example, exterior roof material could be formed of metal, shingle roofing, or other materials including but not limited to single ply membranes any of which have an underlying insulation layer or material. These materials are however merely exemplary and should not be considered limiting. Supporting the roof 12 are at least a first wall 14 and a second wall 16. Each of the first wall 14 and second wall 16 extend from the roof 12 into the earth E supporting the building. This creates a thermal exchange and storage area in the ground beneath building 10 generally wherein temperature zones are created. The walls 14, 16 may each extend continuously in a single piece or may be defined by multiple pours of concrete. Alternatively, the concrete walls 14, 16 may be formed of precast or cast-in-place concrete with exterior insulation, concrete block with mortar-filled cores with exterior insulation or insulated concrete forms. In any event, the concrete, precast or poured, is insulated on at least exterior sides in order to limit or eliminate thermal transfer through the concrete from interior to exterior or vice-versa. Additionally, if insulated concrete forms are utilized, the insulated concrete form should be understood to be insulated on both sides—interior and exterior—of the wall. The walls 14, 16 may be formed of concrete alone or in combination with steel beams in order to provide a building frame or skeleton upon which the concrete is poured or otherwise connected. The walls 14,16 may also be connected with wood frame structures. The walls 14, 16 may have preformed apertures through which piping may extend as described further herein. The exterior and interior finishes of the building 10 may be comprised of various known materials which are known in the art of building construction. These materials are not shown since they will be understood to one of ordinary skill in the art and would render visualization and understanding of the energy relevant components of the building difficult to ascertain.

The building 10 further comprises at least one floor 20, generally at ground level. The floor 20 is also formed of concrete or other known material which is known in the art of building construction. According to the exemplary embodiment depicted in FIG. 1, the exemplary building 10 further comprises a second floor 22 which extends generally between the first wall 14 and second wall 16. The building 10 also comprises a central support wall 17 extending between the floor 20 and the roof 12.

At the bottom of the first and second walls 14, 16 are foundation footings 18. These footings 18 are disposed within the earth E surrounding the building 10 and transfer the weight of the building to the earth E. The footers 18 are disposed at a depth which is some preselected distance below a frost line. The footings 18 may also have some amount of insulation 53 (FIG. 4) along all or some of the structures.

As previously described, the building 10 includes an active thermal transfer system 30. The active thermal transfer system 30 provides active thermal transfer between the building 10 and the earth E to buffer from external ambient conditions as well as regulate indoor temperature conditions. The active thermal system 30 receives thermal energy in the comfort zone $Z_C$ beneath the floor 20 and circulates the thermal energy through the building 10. The active thermal transfer system 30 includes at least one pump 32 and at least one thermal transfer distribution loop 34. The loop 34 may be defined by a pipe having a thermal transfer fluid therein. Although the loop 34 is defined by one fluid flow, one or more pipes may be used. In the instant embodiment, a first piping portion 36 extends either within or beneath the floor 20. This provides one means of transferring energy from the earth to the system 30 within the building 10. The distribution loop 34 also comprises a fluid flow pipe 38 in fluid communication with pipe 36 and extending upwardly through the first and second walls 14, 16. The loop 34 is also defined by at least one fluid flow pipe 39 extending within or immediately beneath the roof material 12. The various pipes 36, 38 and 39 generally envelope the building 10 and are in fluid communication with each other and with the at least one pump 32, and in thermal communication with the earth E beneath the floor 20. The distribution loop 34 moves a first thermal transfer fluid, such as water or other liquid, through the exterior walls and through or just under the floor slab 20 of the building 10. In operation, the distribution loop 34 actively transfers thermal energy between the earth E and the building either from the building 10 to the earth E or from the earth E to the building 10. For example, in the winter, when the Earth temperature is greater than the outside temperature, the fluid will receive thermal energy beneath the floor 20, and transfer the energy to the walls 14, 16 and the roof 12. In the summer, when the outside temperature is greater than the Earth temperature, the temperature beneath the floor 20 will cool the fluid in system 30 which cools the walls 14, 16 and roof 12.

In addition to the active thermal transfer system 30, the building 10 further comprises a geosolar thermal transfer system 40, which converts solar energy to fluid thermal energy within a second thermal transfer fluid, such as water or other liquid, within the solar thermal transfer system 40. The geosolar thermal transfer system 40 either charges or discharges thermal energy with the earth beneath the building 10 in one or more thermal exchange and storage areas. This creates radial thermal zones. The geosolar thermal transfer system 40 includes at least one solar collector 42 which collects solar energy and passes that energy to the second thermal transfer fluid. The solar collector 42 is shown positioned on the building roof 12, however, the solar collector 42 may alternatively be positioned on an awning, building side or any combination thereof. The solar thermal transfer system 40 also includes a pump 44 to move the fluid through at least one pipe 46 disposed within the central wall 17. The pipe 46 continues extending downward through the floor 20 and into a geosolar recharge loop 48. This loop transfers thermal energy to the earth surrounding the loop 48 so that the energy may be stored for later harvesting. Alternatively, thermal energy may be removed from this thermal exchange area to and provided to the building 10 for purpose of heating. For example, heat may be stored in the summer for winter use and coolness, by way of heat removal, may be created and stored for summer use. The solar recharge loop piping 48 may extend as much as 100 feet or more into the earth. The at least one pipe 46 is insulated where it passes through the building and into the earth E below the floor 20. The length of the insulated portion may depend on the thermal conditions of the region where the building 10 is located and the time it takes stored heat to travel from the hot core zone $Z_H$ to the comfort zone $Z_C$ close to the building.

Referring still to FIG. 1, beneath the building 10, various zones are formed in the thermal exchange and storage area by the thermal transfer of energy to the earth from the geosolar thermal transfer system 40. As shown in FIG. 1, a plurality of thermal zones are established about the geosolar recharge loop 48. The zones shown about the geosolar recharge loop 48 are generally indicative of the late summer/early fall season. From late winter/early spring until late summer/early fall, the solar collector 42 collects energy and transfers that thermal energy to the second fluid that runs through the geosolar recharge loop 48. This heats the earth E beneath the building, and most specifically in the hottest zone $Z_H$ immediately surrounding the loop 48. Moving radially outward, as the temperature is slightly less a warm zone $Z_W$ is defined. Moving further radially outward from there, a comfort zone $Z_C$ is defined. This zone may have a temperature range of between about 50-90 degrees, more preferably about 60-80 degrees and even more preferably about 65-72 degrees Fahrenheit or warmer. Moving further outwardly, the thermal exchange and storage area under the building is surrounded by a somewhat cooler zone $Z_E$ generally having the more constant temperature of the earth typical for the region at a specific depth. These zones are generally defined by the temperature gradients moving radially outward from the loop 48. With the zone $Z_H$ surrounding the recharge loop 48 being the hottest, the thermal energy in this area is stored and radiates toward the building so that it may be harvested in the winter for maintaining comfortable warmth within the building. In the zone of comfort $Z_C$, the building 10 receives thermal energy passively by way of interface with the non-insulated lower area 15 (FIG. 4) of the walls 14,16 and contact with the floor slab 20. Thus the building outside temperature is buffered by the comfort zone $Z_C$ and by exterior insulation through both active and passive means.

Referring now to FIG. 2, the same view of FIG. 1 is depicted but the season is changed to late winter/early spring for purpose of explanation the seasonal variation in the zones of the thermal exchange area or thermal storage reservoir beneath the building. By late winter or early spring, the zone closest to the recharge loop 48 is the coldest $Z_O$ and the next zone $Z_E$ moving radially outwardly is cool but not quite as cold. The next adjacent zone is the comfort zone $Z_C$ preferably having a temperature range of about between 60-80 degrees and more specifically in the range of about 62-78 degrees Fahrenheit. Beyond this radial distance, the temperature is the more constant temperature of the earth typical for the region at similar depth, the earth zone $Z_E$. In order to make the area around the recharge loop 48 coldest, the geosolar thermal transfer system may be operated at night to discharge thermal energy from the earth to the sky in what is termed night sky radiation. As a result of this night sky radiation and discharge of thermal energy, the ground beneath the building 10 is cooler than would otherwise be possible, creating cooling storage, by removal of thermal energy, for the summer season during which time the thermal exchange and storage area beneath the building warms in order to create the hot zone $Z_H$ by the end of the summer that will further create comfort for winter harvesting.

Figure 3:
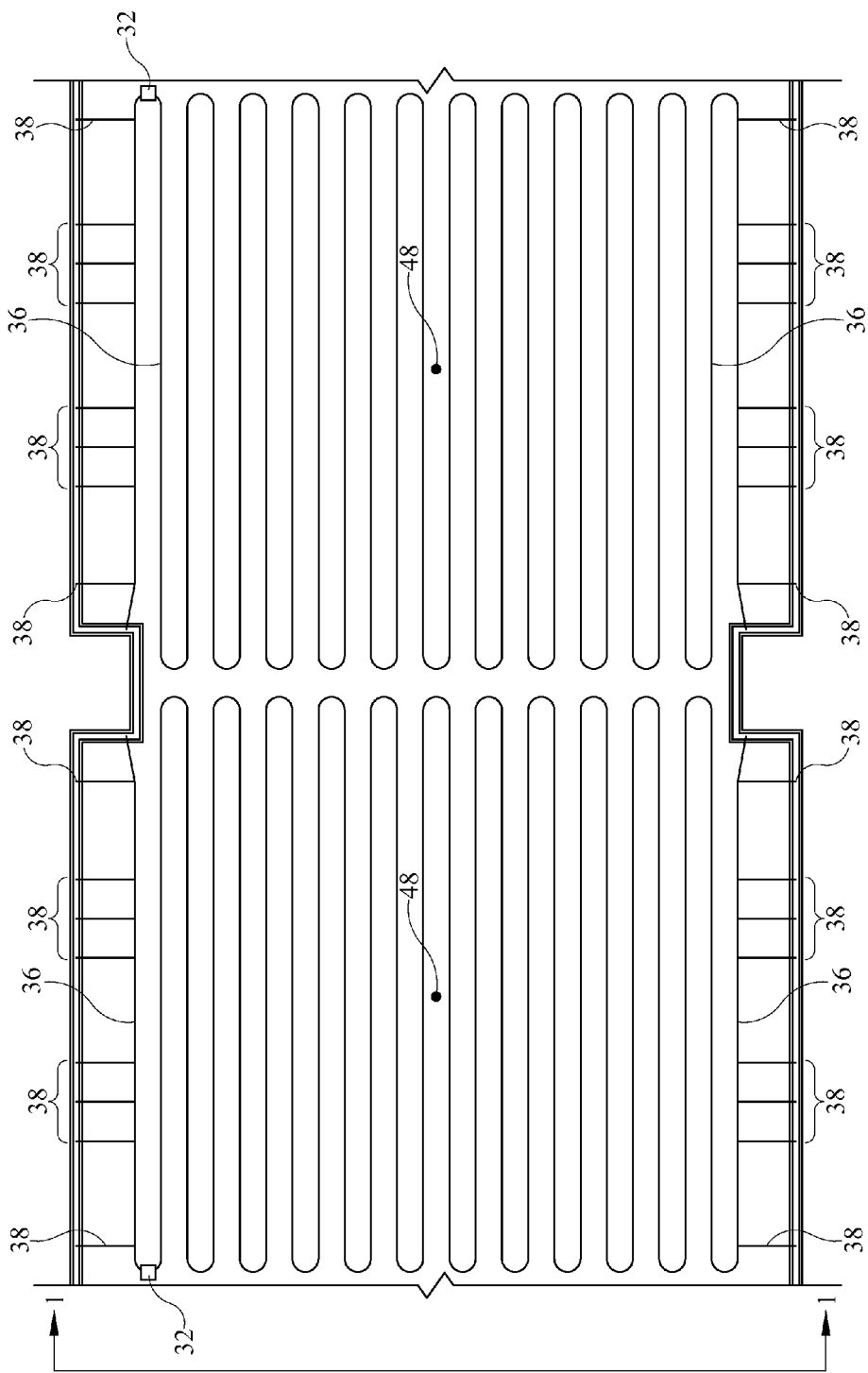
FIG. 3 is a foundation plan view of the building of FIG. 1 utilizing the geosolar building construction.

Referring now to FIG. 3, a foundation plan view of the active thermal transfer system 30 is depicted. With the active thermal transfer system shown, the pump 32 is seen in fluid communication with the serpentine pipe 36 layout beneath the floor slab 20. Also extending upwardly from the horizontally extending pipes 36 are multiple upwardly extending pipes 38 which pass through the first and second walls 14, 16. The pump 32 circulates a first thermal transfer fluid through the horizontal piping 36 and the vertical wall piping 38 as well as the roof piping 39 to actively heat the internal areas of the building 10 or to absorb heat and effect cooling in the building 10, depending on the season.

The foundation plan view also depicts two geosolar recharge loops 48 extending downwardly beneath the building 10. In reference to FIGS. 1, 2 and 3, the exemplary building 10 has two geosolar recharge loops 48 and two active thermal transfer systems 30. However, this description is merely exemplary and should not be considered limiting. Due to the horizontal and vertical piping 36,38 of the active thermal transfer system 30, the exemplary system 30 is termed a hybrid system.

Figure 4:
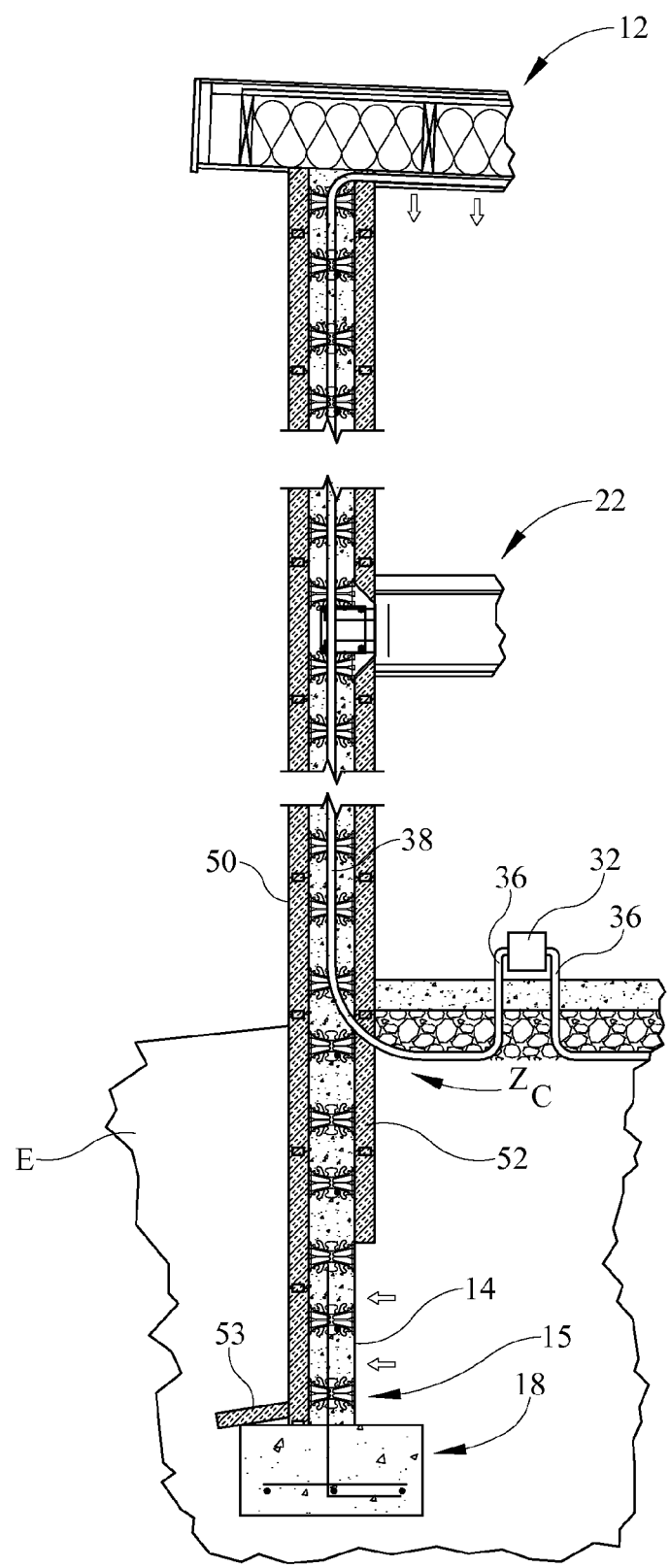
FIG. 4 is a section detail view of an exterior building wall of the exemplary geosolar construction of FIG. 1.

Referring now to FIG. 4, a detail section view of the wall 14 is depicted. For purpose of understanding, on the left side of the wall 14 is the building exterior and on the right side of the wall 14 is the building interior including the second floor 22. At the upper end of the wall 14 is the roof 12. At the bottom of the wall 14 is the footing 18, which provides support for the building wall 14. Along the outer surface of the wall 14 is at least one layer of insulation 50. The footing insulation 53 may cover at least the upper surface of the footing 18. Along the inner surface of the wall 14 is an inner layer of insulation 52, in the case of insulated concrete form walls. The inner insulation 52 is removed at some depth below the surface of the earth E. In this area, the wall 14 is exposed to the temperature of the earth at the depths where temperature is within a desired zone. This allows passive transfer of thermal energy at these depths to the building envelope. Additionally, as one skilled in the art will recognize, the temperature at these depths is closer to the earth constant than at the surface. Accordingly, the building 10 is coupled to the earth E for the passive thermal transfer of energy. In a further alternative embodiment, for instance having core-filled concrete block and concrete walls, it is desirable to maximize the insulation to the outside of the wall and provide full thermal coupling to the comfort zone Zc temperature of the earth close to the building and the interior comfort zone temperature of the building. However, although shown with inner insulation, it should be understood that any of the embodiments described may be utilized with minimal or no inner insulation and should be considered within the scope of the present embodiment.

The pump 32 is shown schematically at the ground level with the distribution loop 34 of the active thermal transfer system 30. The pipes 36 provide input and output flows to and from the pump 32. Additionally, the upwardly extending pipe 38 is also shown passing through the inner insulation 52 and upwardly through the wall 14. As can be understood, the walls 14, 16 must have apertures allowing the pipes to pass there through. Near the roof 12, the pipe 38 is curved to define or otherwise couples with the roof pipe 39.

FIG. 4 also depicts, clearly, two modes of thermal communication between the building 10 and the earth E. First, the building 10 can passively transfer thermal energy through the exposed portion 15 of the insulated concrete wall 14. Second, the building is actively transferring energy to and from the earth via the active thermal transfer system 30 through exposed portions of the building interior. By exposed portions of the building interior or interior surface of exterior wall, Applicant means non-insulated, which should be understood to include either of both of actually exposed interior surfaces as well as surfaces covered by, for instance, drywall, either of these however not being covered with insulation. Such construction thermally couples the building interior with the thermal transfer pipes within the walls of the building.

Figure 5:
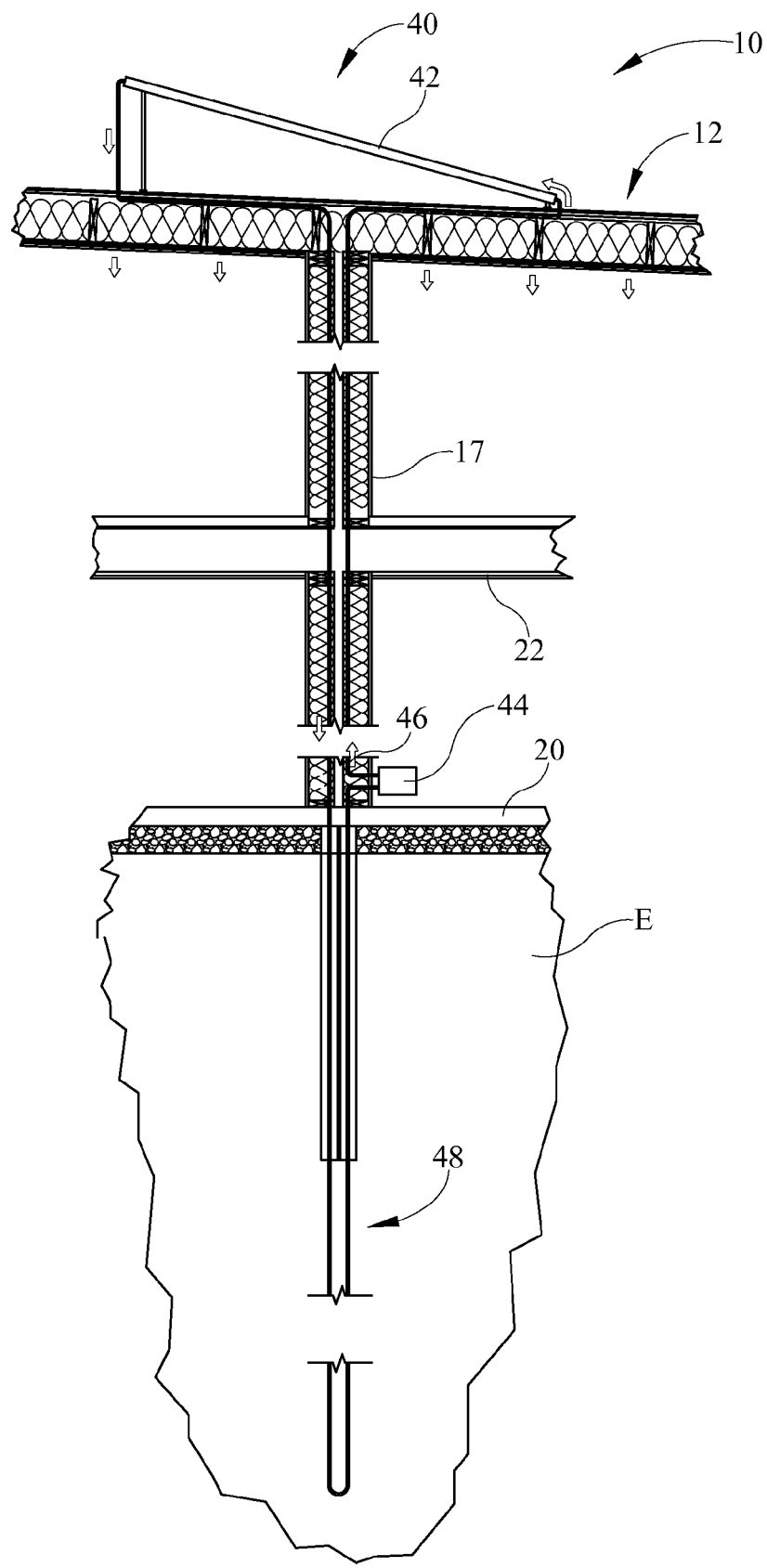
FIG. 5 is a detail section view of the central portion of the exemplary geosolar building construction of FIG. 1.

Referring now to FIG. 5, a section detail of the central area of the building 10 is shown and the geosolar thermal transfer system 40. Extending between the roof 12 and the floor 20 is the central support wall 17. Passing upwardly through the central wall 17 is the piping 46 which extends upward to the solar collector 42 and down to the geosolar recharge loop 48 in the earth. The flow of a second thermal fluid transfer fluid is caused by the pump 44 which is connected at input and output ends to the pipe 46. This defines a fluid flow loop. In operation, the pump 44 causes flow through piping 46 up to the solar collector 42 where the second thermal transfer fluid receives solar energy collected by the collector 42. The second thermal transfer fluid next moves downwardly through the pipes 46 and into the recharge loop 48. In this area, the energy of the second thermal transfer fluid is transferred to the earth E. Alternatively, the second thermal fluid may remove energy from the earth E and discharge to atmosphere through the collectors 42 via night sky radiation.

Figure 6:
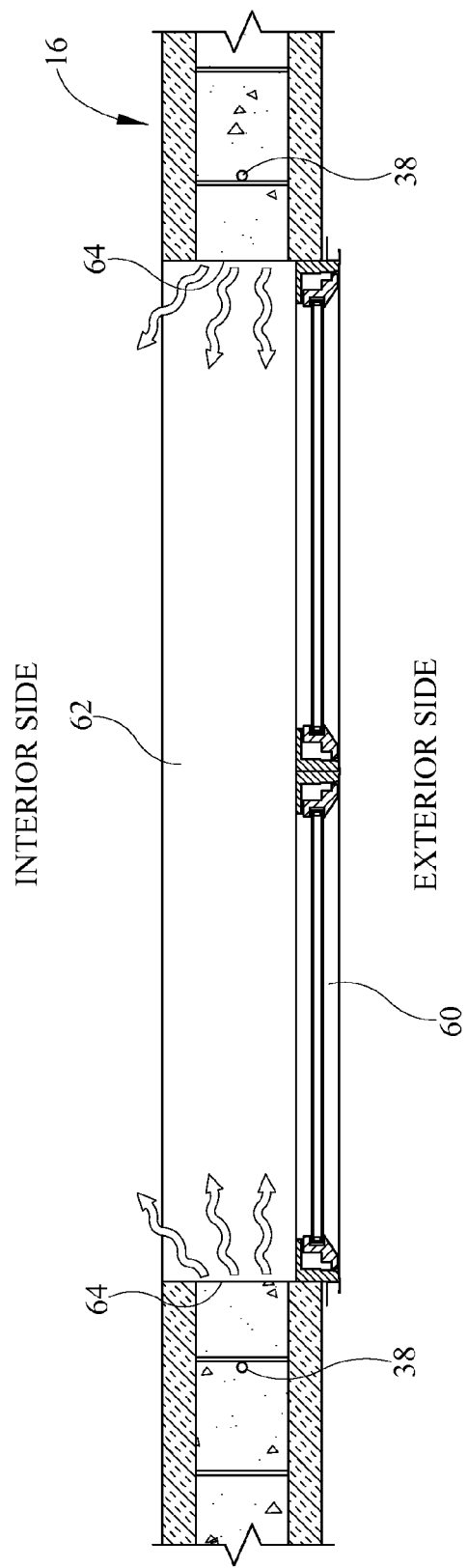
FIG. 6 is a plan section view of an exterior wall and window of the exemplary geosolar building construction.

Referring now to FIG. 6, a plan section view through an exterior window in one of the exterior walls 14, 16 is depicted. The wall 16, for example, is sectioned in the area of a window 60 and the wall 16 is not insulated in the window sill 62 and the vertical surfaces 64 adjacent the frame of the window.

Adjacent the window 60, within the wall 16, are one or more of the upwardly extending pipes 38. The pipes 38 move the first thermal transfer fluid through the wall 16 and the thermal energy is transferred through the exposed areas of the wall 64 and the sill 62 to the building interior to balance the area of greatest thermal energy loss at the window itself. In effect, the energy within the wall 16 and the piping 38 radiates through the exposed concrete 64 and window sill 62 to either heat the building interior in winter or remove heat from the building interior in summer. Although a single window pair 60 is depicted, the construction may be used at one or more various exterior windows to provide radiating thermal energy transfer throughout the building 10.

Figure 7:
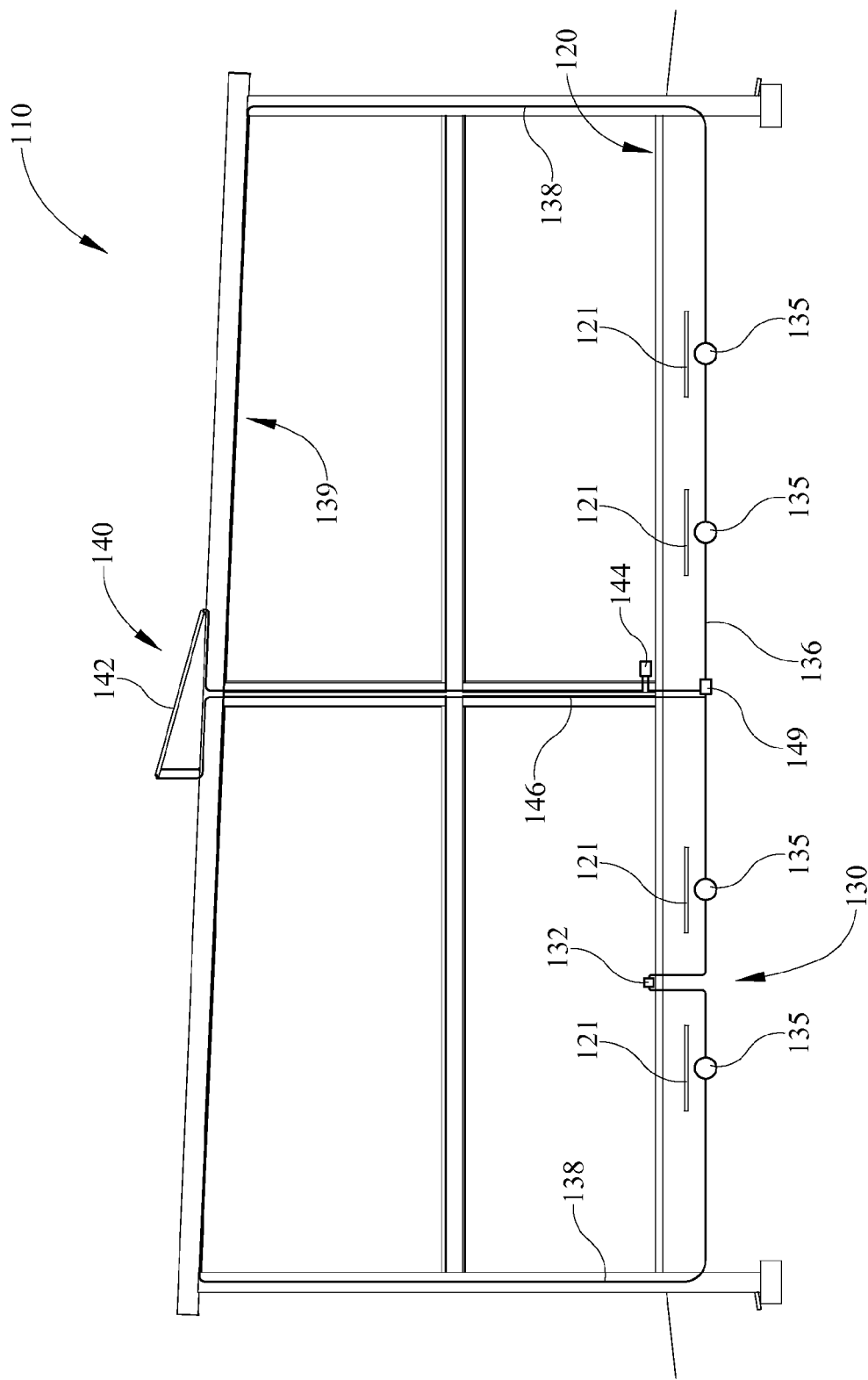
FIG. 7 is a view of a building section of a second embodiment of an exemplary geosolar building construction.
Figure 8:
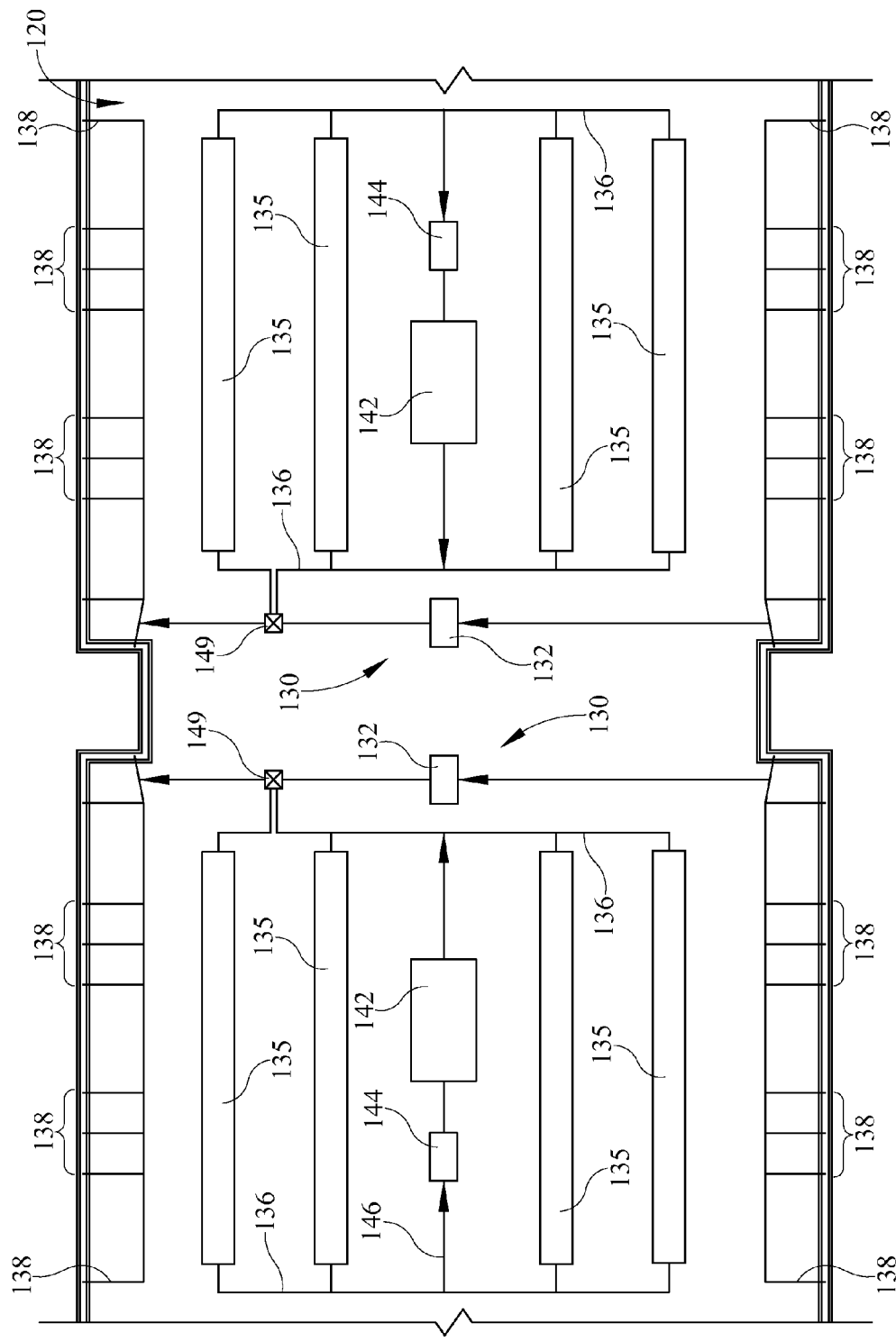
FIG. 8 is a foundation plan view of the second embodiment of FIG. 7.

Referring now to FIGS. 7 and 8, a second embodiment of a geosolar temperature control construction system is depicted wherein the portion of the active thermal transfer system below the floor slab 120 is substantially horizontal. In this embodiment, as opposed to the hybrid embodiment of FIGS. 1-6, there are no vertically extending recharge loops. Thus this system is termed a horizontal system for purpose of distinguishing from the alternate embodiments. In addition to the active thermal transfer system 130, the embodiment also comprises a passive thermal transfer means as well as geosolar thermal transfer system 140.

Referring initially to FIG. 7, a section view of a building 110 is depicted. In this view of building 110, a plurality of substantially horizontal pipes 135 are positioned beneath the floor slab 120. These pipes 135 may be formed of various plastics or other materials and are of larger diameter for larger thermal storage capacity. Above these pipes 135 are one or more pieces of insulation, such as foam insulation. The insulation 121 functions to retain thermal energy within and below the piping 135. Additionally, one or more manifold pipes 136 may connect the segments of piping 135. The piping 135 and one or more manifold pipes 136 are in fluid communication with a pump 132 to force a first thermal transfer fluid upwardly through the walls 14, 16 via upwardly extending piping 138 and on to the roof piping 139. This provides an active thermal transfer system 130 within the building 110.

The second embodiment also provides a passive thermal transfer means. As described with the first embodiment, the second embodiment provides building coupling with the temperature regulated comfort zone of the earth beneath the building 110. As with the first embodiment, the insulated concrete or concrete block wall, or insulated concrete form for example, has the insulation inside the foundation wall removed at a preselected depth below the frost line in order to couple the building 110 to this zone of temperature within the earth E.

A third form of temperature regulation occurs from the geosolar recharge system 140. The geosolar recharging occurs by charging or discharging of thermal energy in order to heat or cool the earth E beneath the slab 120 and in the area of piping 135. Additionally, the geosolar recharge system may be utilized to heat or cool the thermal transfer fluid of the active thermal transfer system 130 by mixing the first thermal transfer fluid with a second thermal transfer fluid being heated or cooled in the geosolar recharge system 140 with a mixing valve 149.

The geosolar recharging system 140 comprises at least one solar collector 142 which receives solar energy or discharges energy through night sky radiation. Piping 146 is connected to the solar collector 142 in order to heat or cool the second thermal transfer fluid. A pump 144 is in fluid communication with piping 146 to pump the second thermal fluid between the solar collector 142 and the manifold 136.

Figure 9:
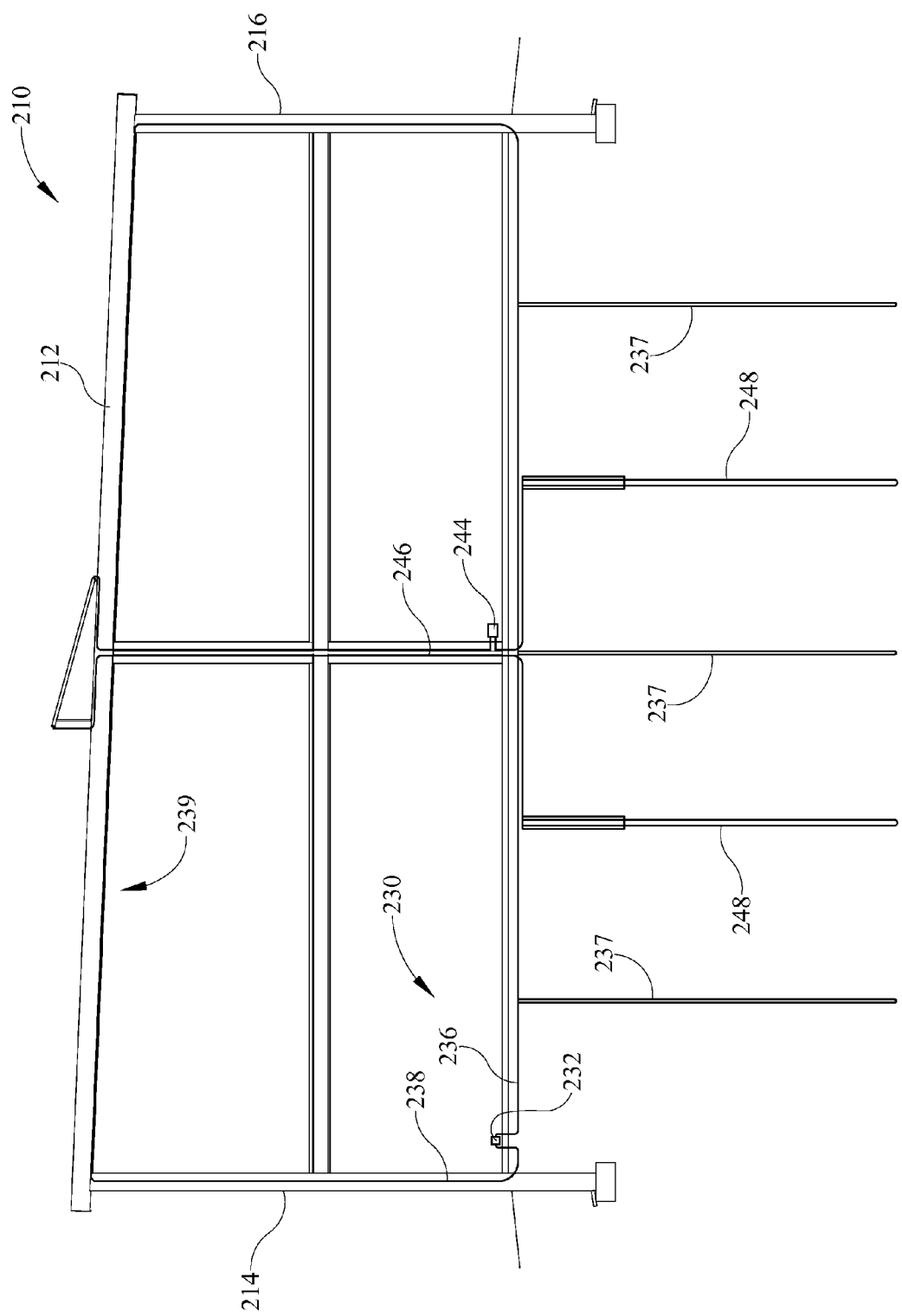
FIG. 9 is a view of a building section of a third embodiment of a geosolar building construction.
Figure 10:
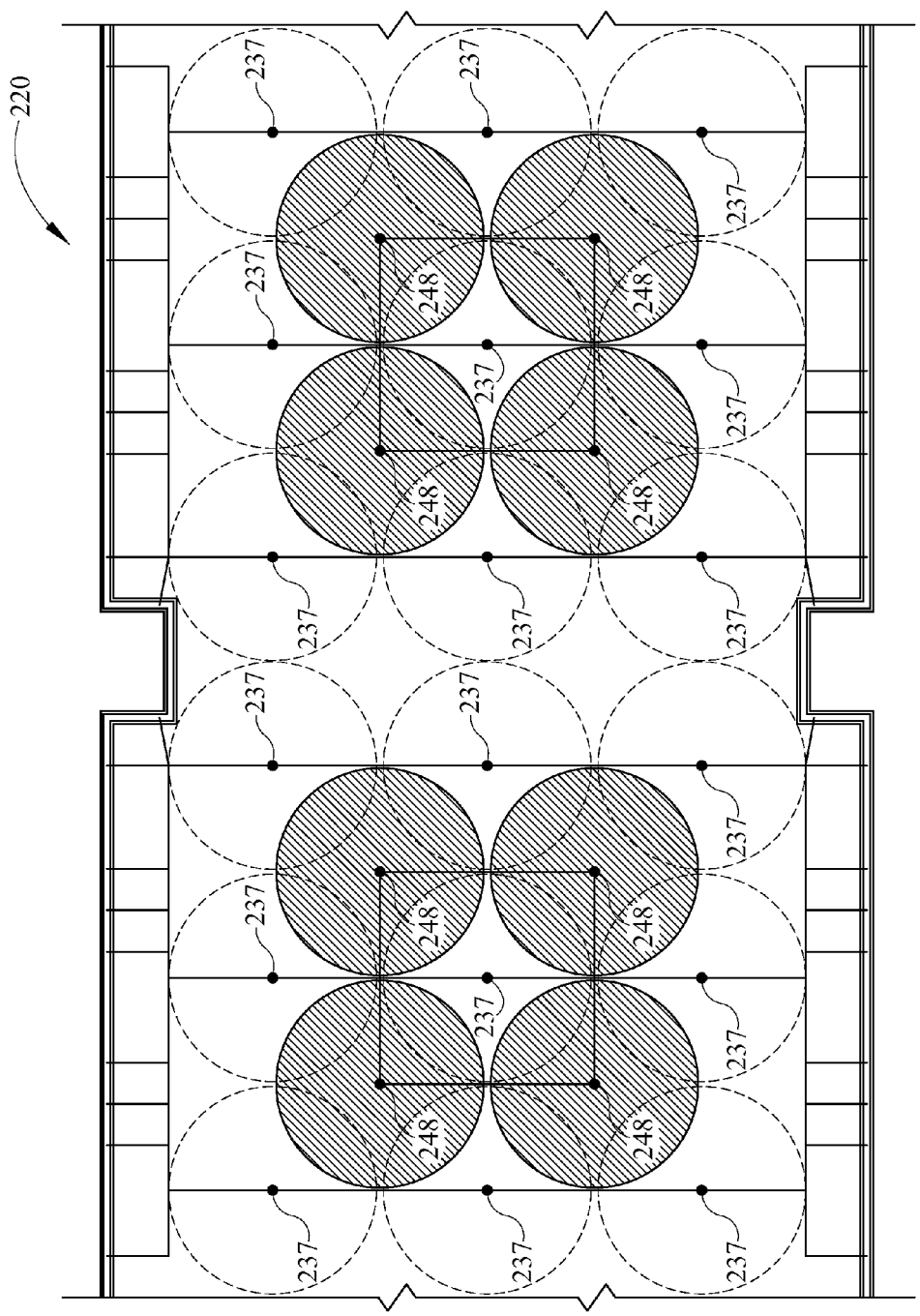
FIG. 10 is a foundation plan view of the third embodiment of the geosolar building construction.

Referring now to FIGS. 9 and 10, a vertical geosolar temperature control construction system is depicted. Whereas the hybrid system of FIGS. 1-6 incorporated both vertical and horizontal storage and the system of FIGS. 7 and 8 incorporated horizontal storage alone, the system of the instant embodiment orients piping in a substantially vertical direction to store and retrieve thermal energy. Referring first to FIG. 9, a section view of a building is depicted. In the instant embodiment of the building 210 is of similar construction as previously described and therefore will not be repeated. A geosolar thermal transfer system 240 is utilized having a solar collector 242 which transfers solar energy for storage in the earth E, or discharges thermal energy by means of night sky radiation, via the a second thermal transfer fluid. The thermal transfer system 240 also comprises a pump 244 for pumping the second thermal transfer fluid from the solar collector 242 to a plurality of geosolar recharge loops 248, through piping 246 in the central portion of the building 210. Each of the geosolar recharge loops 248 are shaded in FIG. 10 to distinguish from vertical distribution loops 237, which are included in the active thermal transfer system 230.

The active thermal transfer system 230 includes a pump 232 which pumps a first thermal transfer fluid through the vertical pipes extending through the walls 214, 216 to the pipe 239 near the roof 212. The active thermal transfer system 230 includes a plurality of vertical distribution loops 237. As shown in FIG. 10, in the foundation plan view, plurality of vertical distribution loops 237 are positioned about the geosolar recharge loops 248. Although the active thermal transfer system 230 includes some limited horizontal manifold type piping to connect the vertical distribution loops 237, the horizontal piping is limited and hence the active thermal transfer system of this embodiment is termed the vertical system.

The active thermal transfer system 230 utilizes the temperature in the comfort zone $Z_C$ of the earth E to regulate the temperature of the first thermal transfer fluid and subsequently pumps that first fluid through the active thermal transfer system into the building envelope, defined by the walls and roof. As the first fluid moves through the walls 214, 216, the first thermal fluid again passes adjacent the window sills and jams, as previously described to radiate heat or absorb heat depending on the building temperature and the temperature around these areas of the windows.

Figure 11:
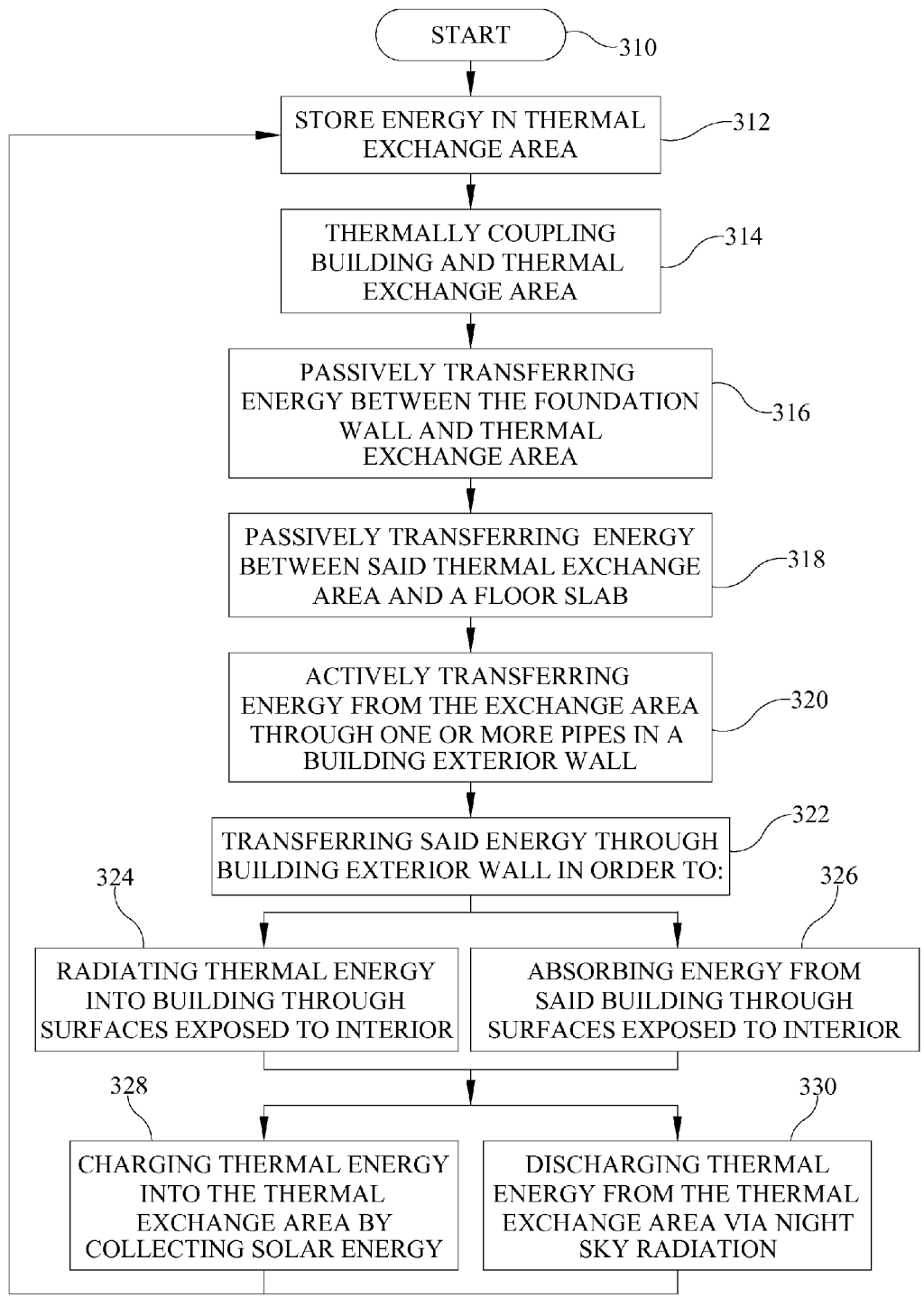
FIG. 11 is a flow chart depicting an exemplary method of operation.

Referring now to FIG. 11, a flowchart is depicted which shows one embodiment of operation of the geosolar temperature control method of operation. The method begins at a starting point 310 where energy is stored in a thermal exchange area at step 312. This occurs through the use of the geosolar thermal transfer system 40, for example. Next, the building 10 is thermally coupled to the thermal exchange area at step 314. As previously described, this occurs by removing insulation along the interior surfaces of the foundation wall and at a depth below the known frost line for a given region where the building 10 is located. Next, energy is passively transferred from the foundation wall to the thermal exchange area beneath the building at step 316. Additionally, at step 318, energy is passively transferred between the thermal exchange area and the floor slab 20.

In addition to this passive transfer of thermal energy, the system actively transfers thermal energy from the exchange area through one or more pipes and a building exterior wall at step 320. The thermal energy is transferred through the building exterior walls, at step 322, in order to either radiate thermal energy into the building through exposed surfaces at step 324, or absorb thermal energy from the building through exposed surfaces at step 326.

Subsequently, the thermal exchange area is either charged by the solar collector at step 328 or the thermal energy is discharged from the thermal exchange area via night sky radiation at step 330. In the event of charging of the thermal exchange area, the process returns back to step 312 where the energy collected is stored in the thermal exchange area and the process begins again. Although the single embodiment is described, alternate steps or order of steps may be utilized and are considered to be within the scope of the present invention.

Figure 12:
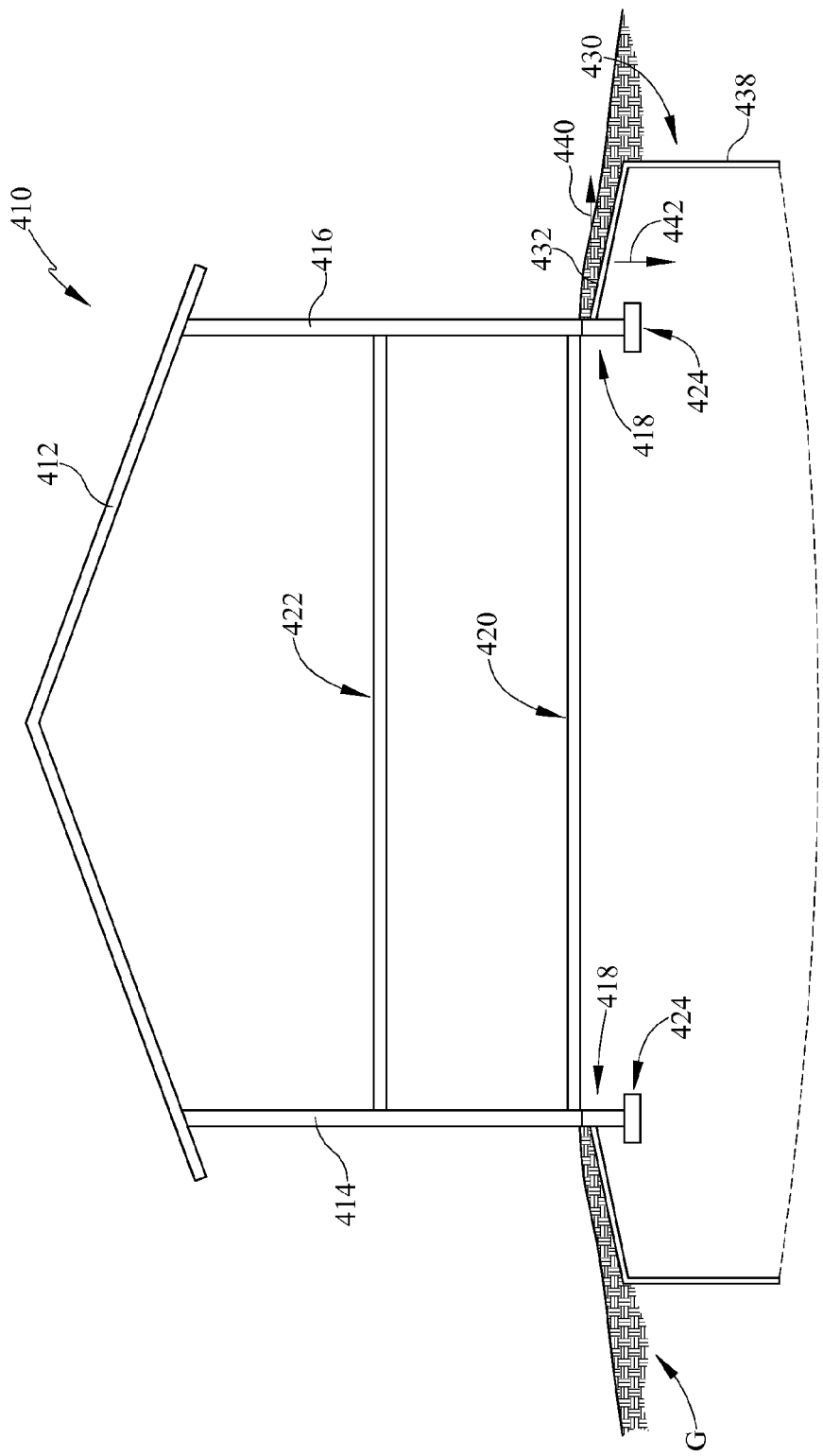
FIG. 12 is a side section view of a geosolar building construction having an insulated perimeter.

Referring now to FIG. 12, a side section view of a building structure or envelope 410 is depicted. The structure includes a roof 412 and support walls 414, 416. A plurality of walls may be utilized or at least one wall to provide the building structure. A lower floor 420 extends at a first elevation between the first and second walls 414, 416. A second floor 422 extends between the first wall 414 and second wall 416. This is exemplary, however, and the building may comprise a single elevation or multi-floor structure. A concrete foundation wall 418 is positioned near a lower end of the first wall 414 and the second wall 416. The envelope further comprises a foundation footer 424 disposed beneath the concrete foundation wall 418 along the perimeter of the building structure 410. The first wall and second wall 414, 416 are formed of at least one of metal or wood members as will be described further herein. These frame members are positioned on the concrete foundation wall 418 so that the first and second walls 414, 416 may be connected to the foundation wall 418 by a plurality of known manners and connections which would be known to one skilled in the art.

Extending from the concrete foundation wall 418 is an insulated perimeter 430. The perimeter includes a first portion 432 and may contain a second portion 438. The first portion 432 may be angled or horizontal and the second portion 438 may be vertical or angled downwardly. The first portion 432 is shown having a horizontal component 440 and a vertical component 442 providing a downwardly angled or slanted first portion of the insulated perimeter 430. The horizontal component 440 and a vertical component 442 together define the angle of the first portion 432 which may vary within a preselected range. Although the first portion 432 may be horizontal, it is desirable that the angle of the first portion 432 provide for drainage of fluid which may accumulate on the insulation perimeter 430. The second portion 438 extends vertically downward from the first portion 432 at or near a distal end of the first portion 432. The second portion 438 may extend vertically downward through a frost line, for example, and together the first and second portions 432, 438 provide the spaced insulated perimeter 430 about the exterior of the building 410. The first portion 432 extends from the concrete foundation wall 418 as depicted. However, the insulated perimeter 430 may alternatively extend from the foundation footer 424.

Figure 13:
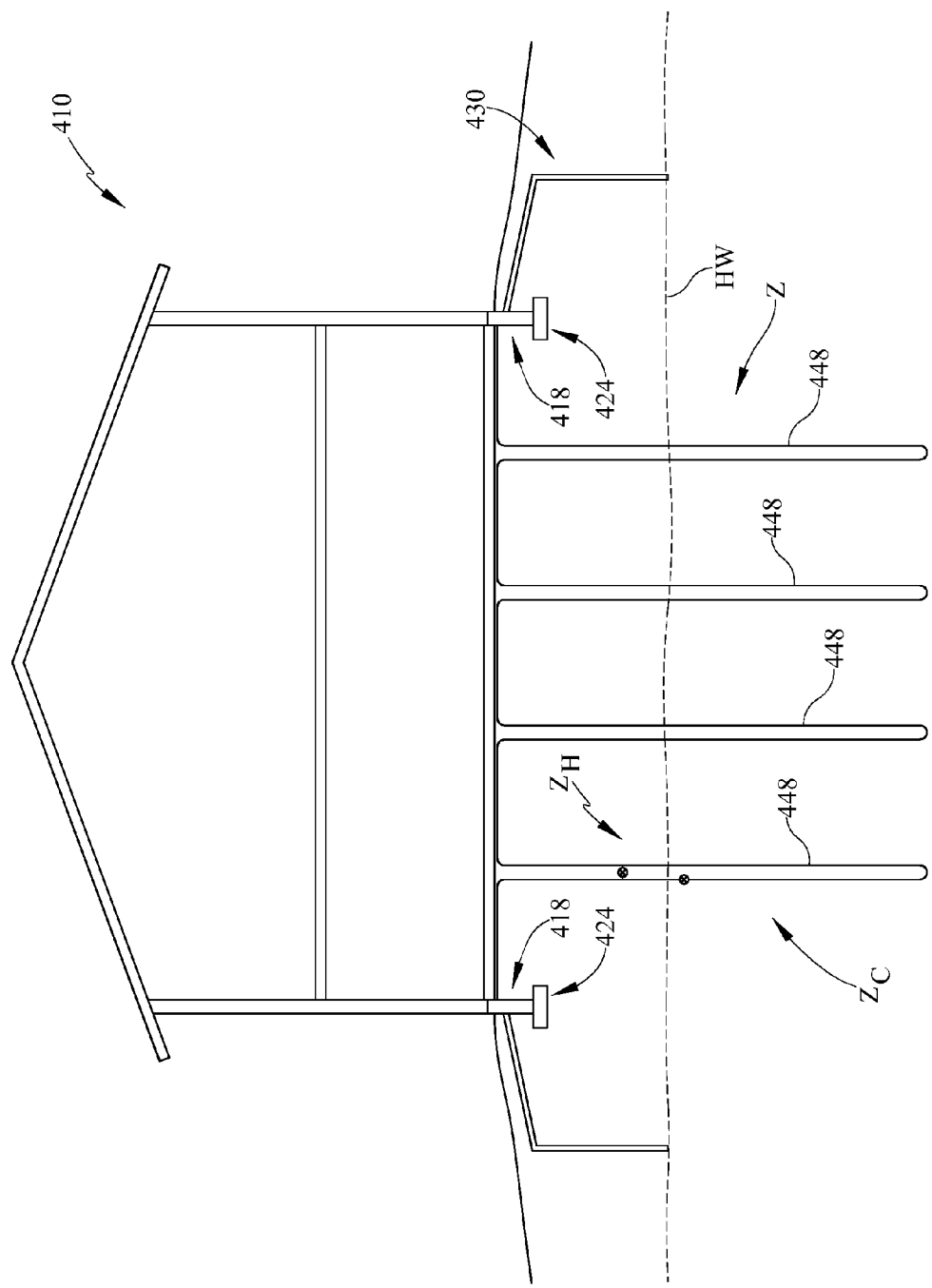
FIG. 13 is a side section view of a geothermal building construction with vertically opposed zones established by high water table.

Referring now to FIG. 13, the side section view of FIG. 12 is depicted in further detail. The embodiment shown in FIG. 13 comprises a structure 410 which is seated on an area having a high groundwater table. The high groundwater table is indicated by the broken line HW extending beneath the structure 410. The insulated perimeter 430 extends downward to the high water line HW. With water proof or non-absorbent materials, the insulated perimeter 430 may extend further.

The closed loop tubes 448 extend downwardly beneath the floor 420 and within the perimeter defined by the insulated perimeter 430. These tubes 448 may extend vertically as shown or both vertically and horizontally to provide different zones for geothermal control. According to this embodiment, the area above the groundwater table HW is utilized for storing heat while the area beneath the groundwater table is utilized for cooling of warmer fluids. The closed loop pipes 448 extend from a solar recharge area on the roof, described in the previous embodiments, downwardly through the building structures 414 and 416, for example and further downwardly beneath the 420 into the temperature controlled zone Z. Thus, the area beneath the groundwater or high water line HW is a zone of cooling Zc and the area above the high water line is an area of heating Zh. The cooling loops 448 extend through both the zone of heat Zh and the zone of cooling Zc. The piping 448 may be insulated depending upon the depths the piping travels into the earth.

The piping 448 may include valves which open and close to allow the thermal fluid to move from the first heating zone Zh downwardly to the lower heating zone Zc. Alternatively, one valve may open while another closes opposite the previous description in order to prevent fluids from passing into the lower zone Zc. This valveing may be provided to flow-path situations desired.

Figure 14:
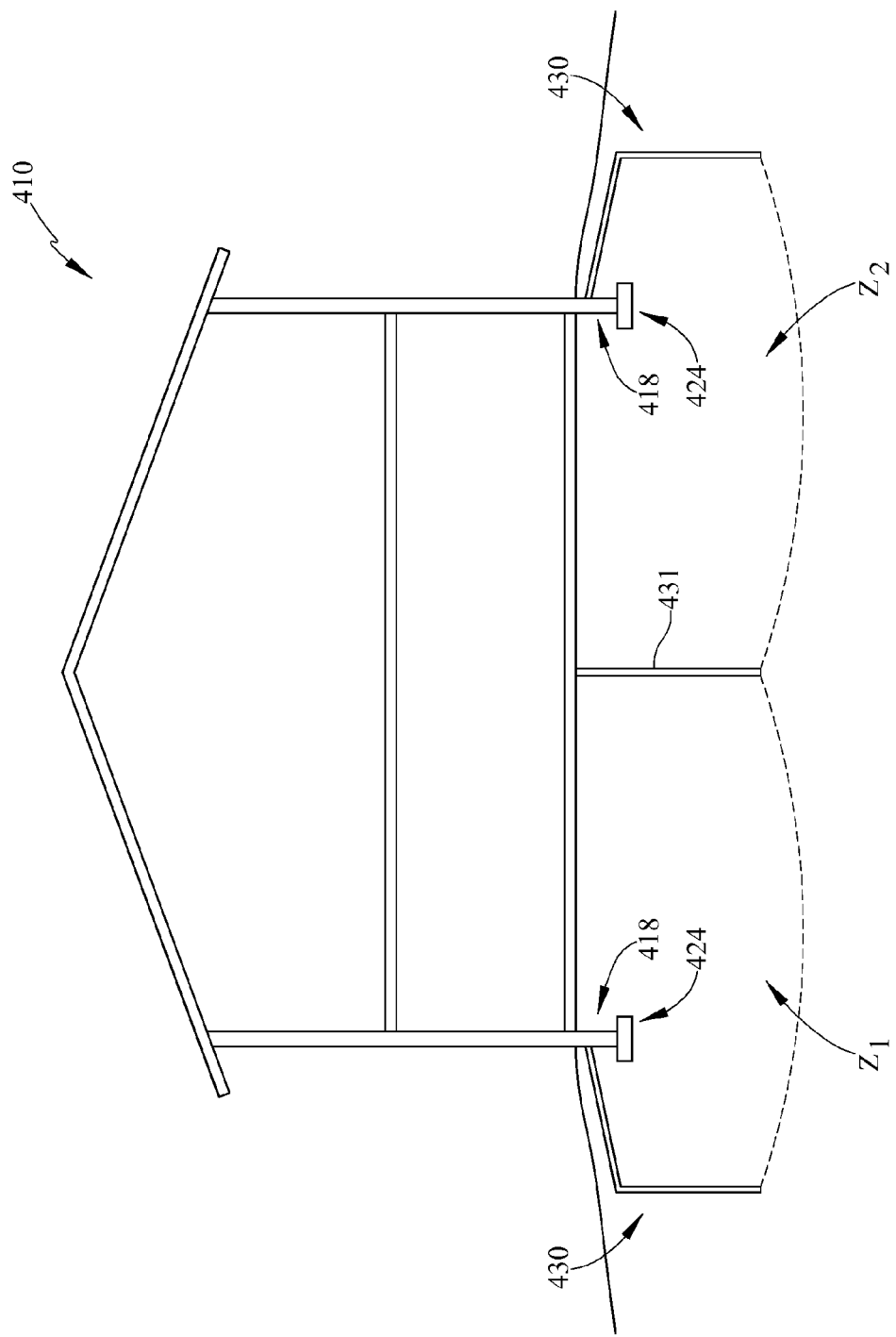
FIG. 14 is a side section view of a geothermal building construction having horizontally opposed thermal zones.

Referring now to FIG. 14, a building 410 is depicted having a system which may be differentiated from the embodiment of FIG. 13 wherein the heating and cooling zones were differentiated relative to a horizontal elevation beneath the building structure 410, the embodiment of FIG. 14. The zones of heating and cooling storage are defined by a vertical divider 431 which forms horizontally opposed zones rather than vertically opposed. Again, the insulated perimeter 430 is defined extending from one of the concrete foundation wall 418 or the footer 424. The vertical divider 431 is positioned extending below the building 410 and defining a first zone $Z_1$ and a second zone $Z_2$. One of the first and second zones is for storage of heat and the other of the first and second zones is for storage of cooling.

Figure 15:
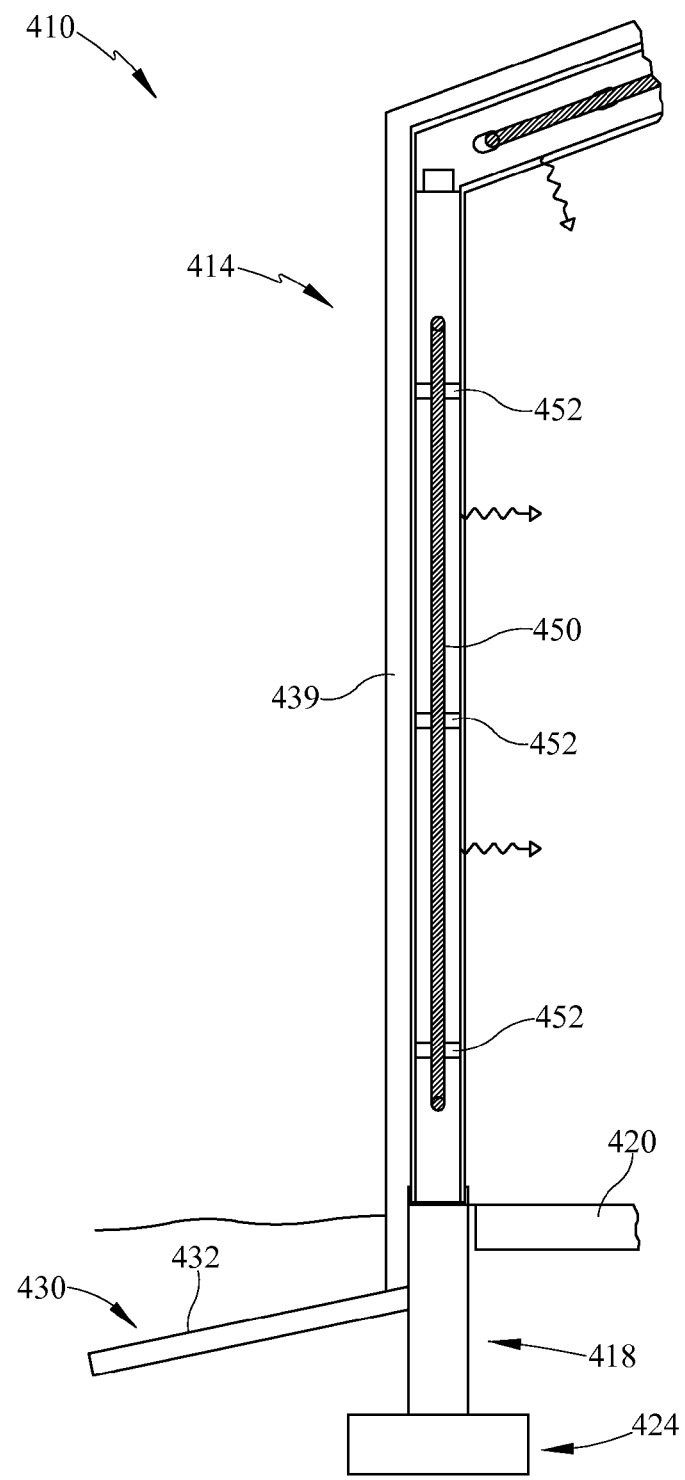
FIG. 15 is a side section view of a wall construction.

Referring now to FIG. 15, a detail section view of a building wall 414 is depicted. An exterior board insulation 439 may be located on the outer portion of the wall 414. The exterior board insulation is fastened to the wall 414 which may be formed of metal or wood members. According to the instant embodiment, the wall construction has metal members 415. A concrete foundation wall 418 is connected to a footer 424. The wall and footer may or may not be anchored together. At the top of the concrete wall is a channel 419 which receives the vertical metal members and which is fastened to the concrete wall 418. Located within the wall 414 is at least one thermal distribution pipe 450. The wall 414 allows for thermal transfer of energy through the wall area in areas where the wall is un-insulated toward the inside or interior of the building 410. Otherwise stated, the wall 414 becomes a geosolar radiator toward the interior space of the building to heat or cool as depicted by the curvilinear arrows. A plurality of clips 452 position the thermal piping 450 away from the inner drywall so as to inhibit function of the piping from drywall nails or screws.

Figure 16:
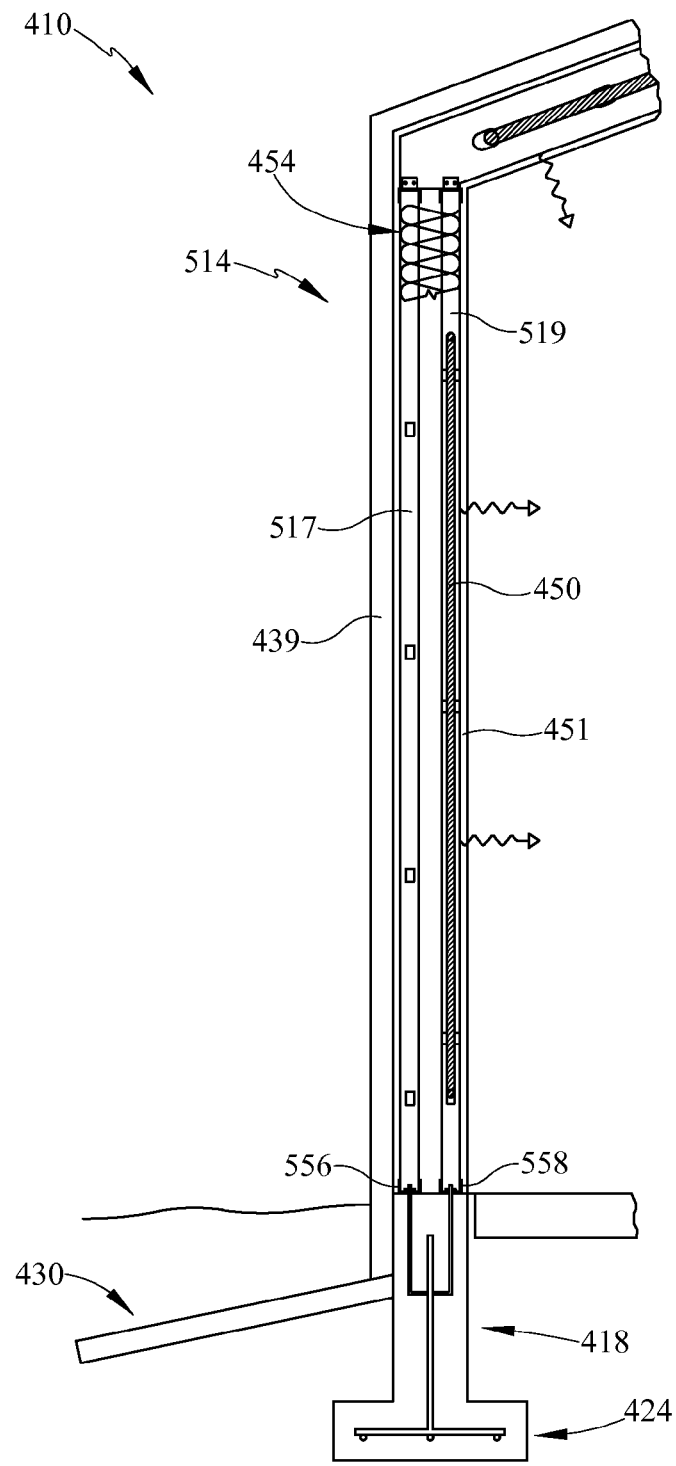
FIG. 16 is a side section view of an alternate wall construction.

Referring now to FIG. 16, an alternative embodiment of the wall 414 is depicted. In the instant embodiment, wall 514 is formed with first and second studs 517, 519 extending vertically to form a wall above the concrete foundation wall 418 and footer 424. Each of the studs 517, 519 is anchored to the concrete foundation wall 418 by anchors and/or plates as will be known to one skilled in the art. For example, at the bottom of the wall 414 near the intersection with the concrete foundation wall 418, two plates are shown 556, 558 which are utilized to connect the wall studs.

The instant embodiment depicts metal studs or members, but various member-types may be utilized, for example wood studs as previously discussed. Depending from the upper end of the wall 514 insulation extends through the wall cavity toward the concrete foundation wall 418 along the outward side of a thermal piping 450. The insulation, therefore, does not interfere with the thermal piping 450 radiating heat into the building or absorbing heat (to cool) from the building interior as depicted by the schematic curvilinear arrows. As described in the previous embodiment, clips may be utilized to space the thermal piping 450 away from the inner surface of the wall 514 inhibiting puncture from drywall nails, screws, picture hanging nails, or the like. Along the outer surface of the walls is an insulation board 439 which provides an outer layer of insulation for the building 410.

Referring now to FIG. 17, a top section view of a clip 452 is depicted. The clip 452 provides a location for thermal distribution pipe 450 to extend vertically through the wall while keeping the pipe 450 spaced a distance X from the inner wall 451. This distance X is greater than a distance of a normal drywall screw, nail, or picture hanging component. The spring 452 is generally a C-shaped channel structure that may be extruded as typical with metal parts. A spring 454 is disposed between ends of the clip 452 and applies a retaining force on the piping 450 to retain the piping in position and inhibit movement toward a wall through which a screw, nail, or other component might be positioned. The spring 454 includes a first arm 456 and a second arm 458 which are connected and may be bent or loaded to capture the tubing 450 in position against a channel wall. Further this design positions the piping 450 away from the wall 451. A manifold 457 extends beneath the piping 450 and the channel or clip 452 includes an aperture 453 through which the manifold may pass. The metal frame members may also act as radiators according to the embodiments utilizing a metal stud wall.

Referring to FIG. 18, the channel 452 is depicted with a spring 455 of alternate construction. This spring 455 includes a first arm 460, a second arm 462, and a curvilinear portion extending between the first and second spring arm 460, 462. This third curvilinear portion 464 captures the tubing or piping 450 against a wall of the channel or clip 452. The various portions of spring 455 are loaded and retain tubing 450 in position within the channel 452 and away from the interior wall 451 which inhibits damage to the tubing from screws, nails or the like.

Figure 19:
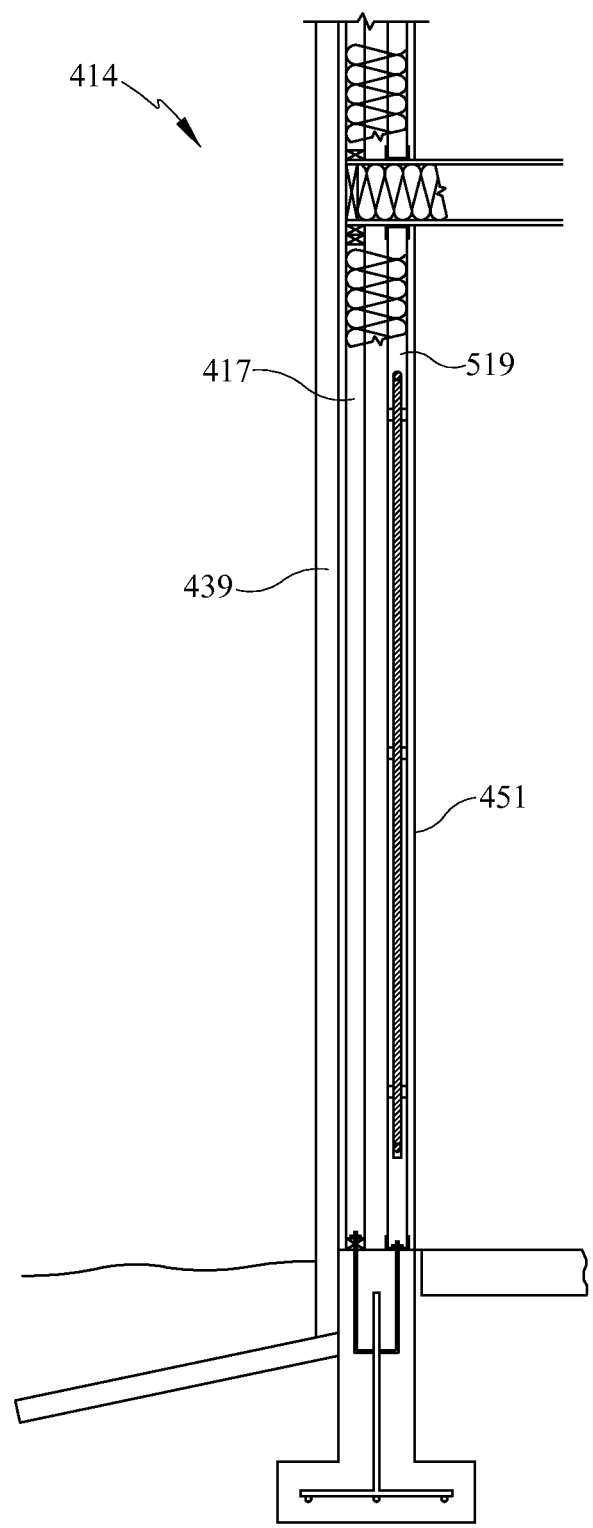
FIG. 19 is a side section view of a further alternate wall construction.

Referring now to FIG. 19, an alternate embodiment of the wall 414 is depicted. An outer insulation layer 439 is shown and inwardly of such insulation layer 439 is a wood stud 417. An inner metal stud 519 is shown closest to the interior of the building. An inner drywall surface 451 is depicted against the metal stud 519. Thus, the wall may comprise a wood frame or metal frame which has a single stud, or a double stud wall which may either be all wood, or all metal members or a combination of wood and metal members.

As previously described, it is desirable that a metal stud structure is utilized with the walls described herein. Further, these metal stud members may further act as a radiator for heat to aid in heating or cooling the structure 410.

Figure 20:
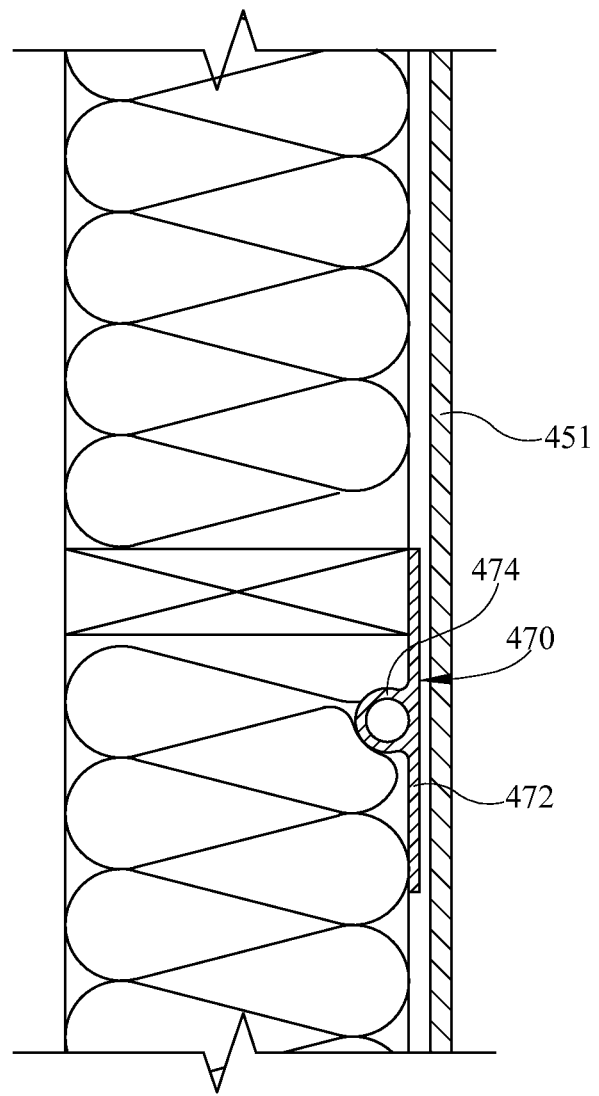
FIG. 20 is a section view of a radiator plate in a wall.

Referring now to FIG. 20, a radiant plate 470 is depicted in the top view. The plate 470 includes a planar portion 472 and a ring or other retaining structure 474. The ring 474 is utilized to retain the thermal piping 450 and allows for transfer of thermal energy through the plate 472 and through the wall 451. The ring structure may be a full circle or may be a partial circle having enough perimeter to retain a thermal piping 450 therein. Additionally, alternative structures may be utilized other than circular cross section and are considered to be within the scope of the instant description. The radiator plate 470 may be formed of a high thermal conductive material such as various types of metallic plates 470.

Figure 21:
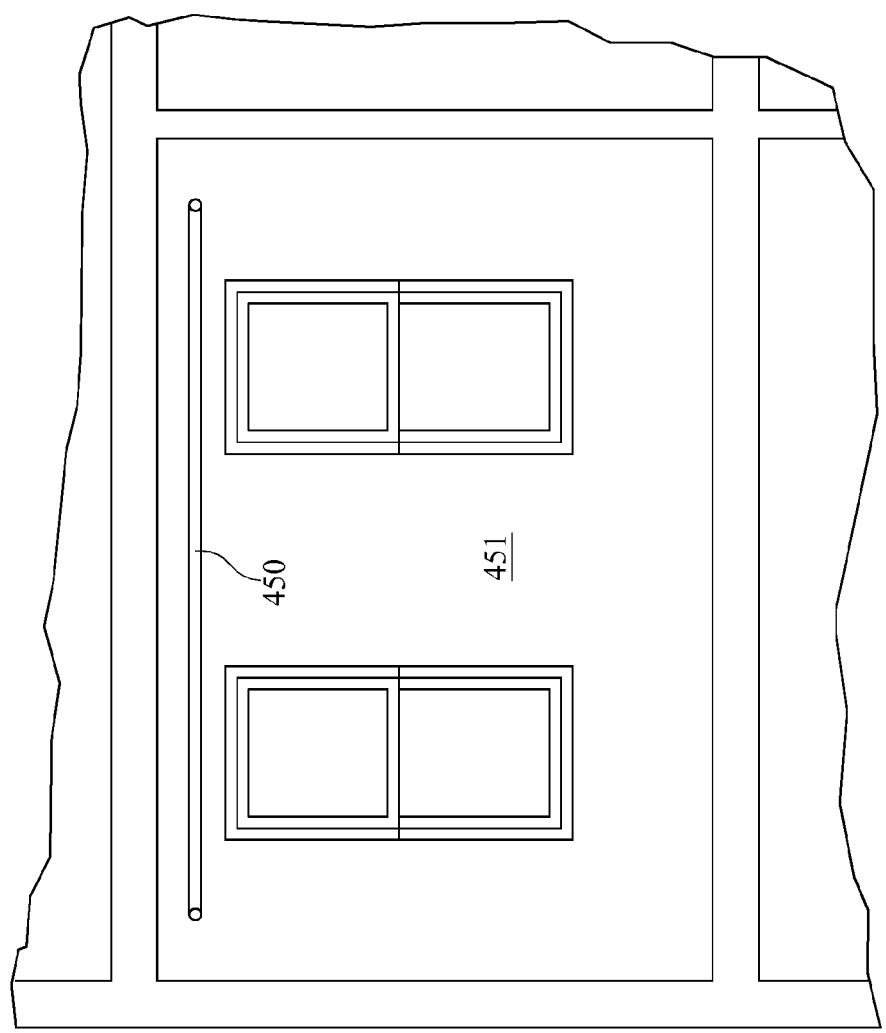
FIG. 21 is a section view of an exposed thermal tubing.

Referring now to FIG. 21, an interior view of a building structure is depicted. According to the embodiment shown, the thermal piping 450 extends from the wall 451 and is suspended within the room shown. The piping 450 may be suspended above windows as well to compensate for any energy loss through the window. As may also be considered within the scope of the present disclosure, the piping 450 may extend along the exterior of the walls or may depend from the ceiling of the building interior whether the ceiling is finished or an exposed type ceiling, typical with lofts for example.

Figure 22:
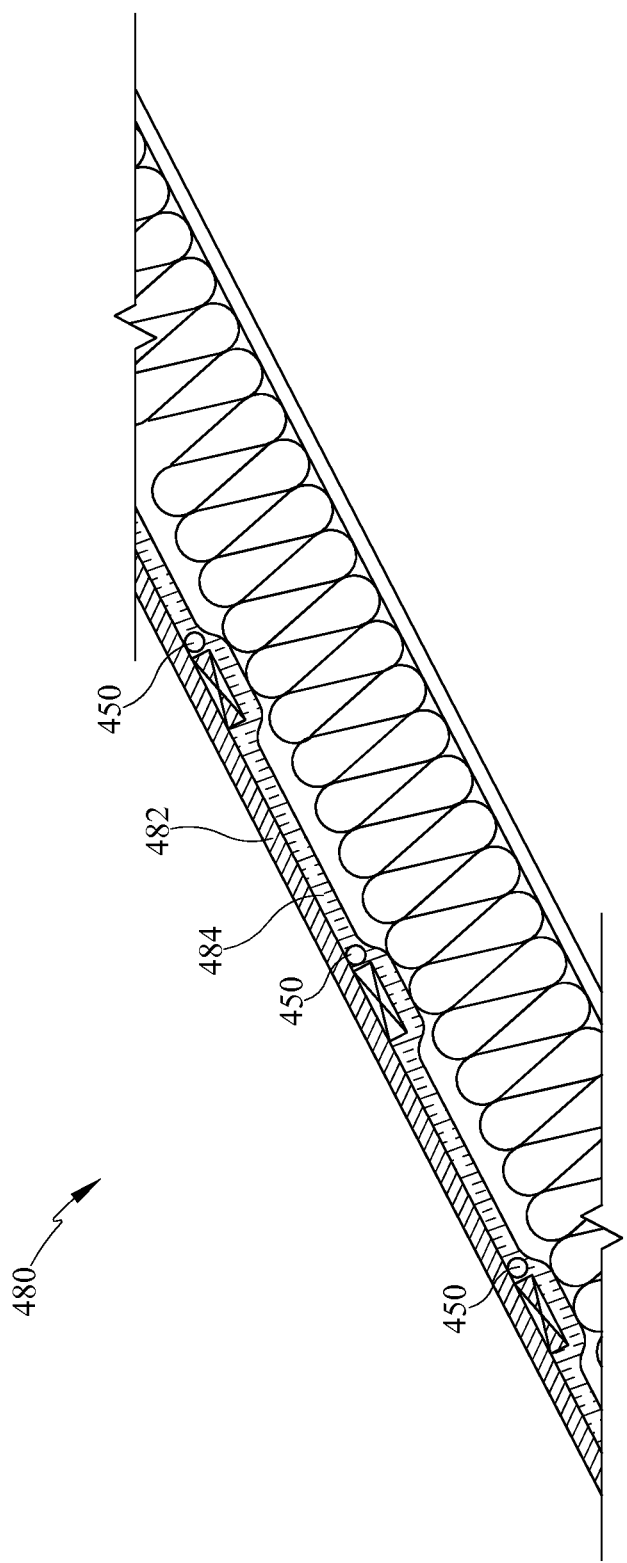
FIG. 22 is an angled roofline with a geosolar control system.
Figure 23:
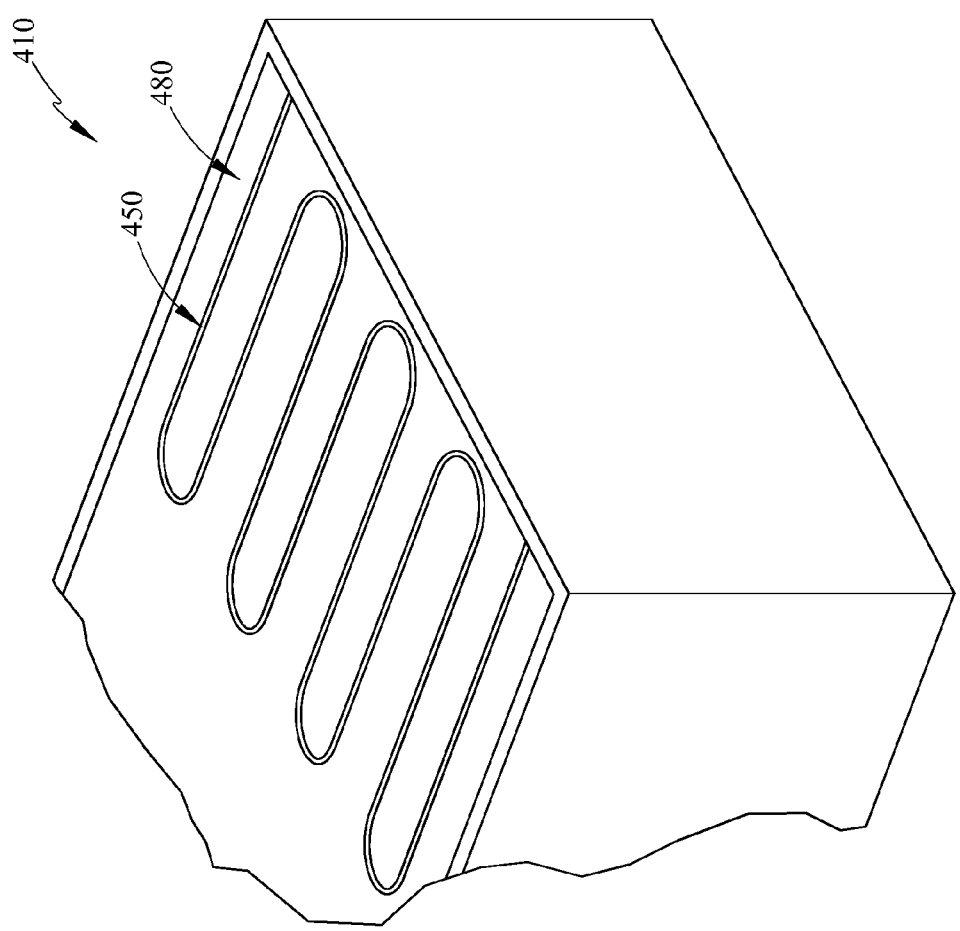
FIG. 23 is an exemplary perspective view of the embodiment of FIG. 22.

Referring now to FIG. 22, a slanted roof line is shown in cross section. The roof line assembly 480 utilizes a flexible piping 450 along the inner surface of a metallic roof 482. The assembly 480 is utilized as a heat collector to absorb heat from sunlight and utilize the metallic roof to do such. Beneath the metal roof 482 is an insulation layer 484 through which thermal piping 450 is routed in serpentine fashion, as shown in FIG. 23. Alternatively, piping may move energy from beneath the building up to the roof where the energy's discharged atmosphere through the metallic roof 482. Although FIG. 22 depicts a slanted roof, it should be understood by one skilled in the art that the serpentine piping may be utilized as a solar collector on flat or low slope roofs as in FIG. 23. Additionally, the collector arrangement may be laid on the outer most surface of the roof.

Figure 24:
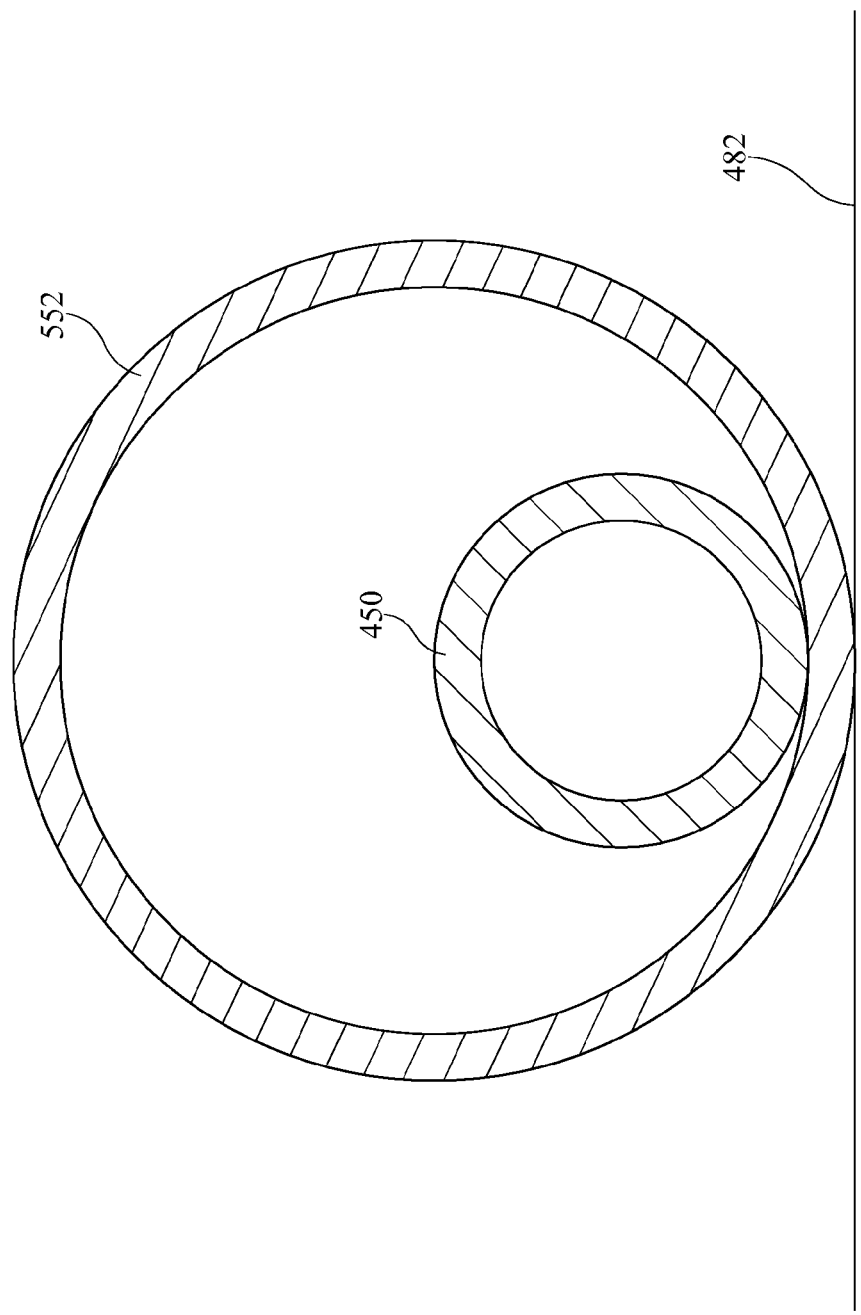
FIG. 24 is a solar collection embodiment which may be utilized with a roof line.

Referring now to FIG. 24, an embodiment is depicted which may be suitable for colder climates. A flexible clear tubing 552 is disposed on the roof 482. Within the clear tubing 552 is the thermal piping or tubing 450. According to such embodiment, it would be desirable that the tubing 450 be of a dark color to absorb heat.

Figure 25:
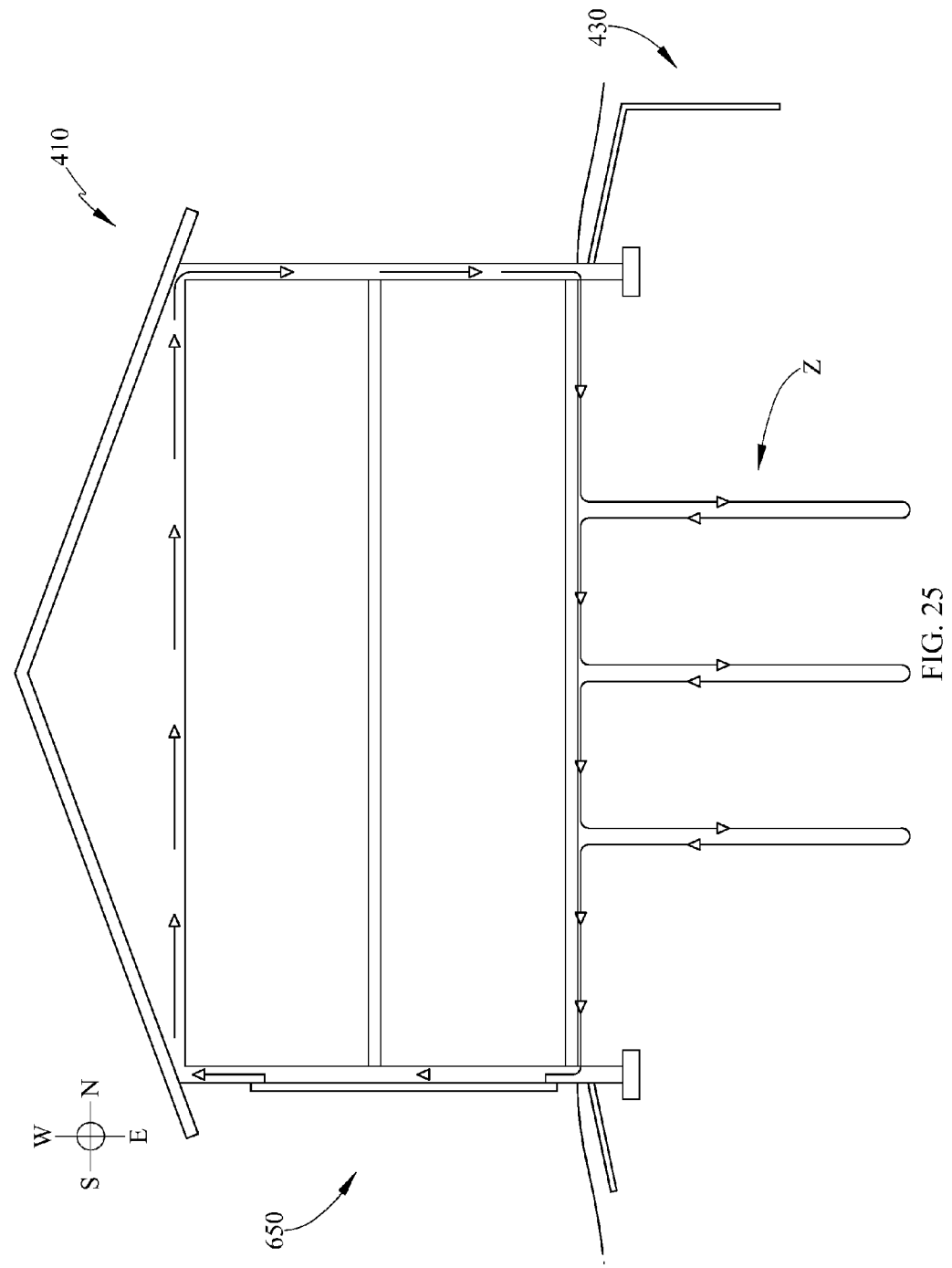
FIG. 25 is a geosolar building construction with a solar collection system on a south facing wall.

Referring now to FIG. 25, an embodiment is depicted wherein the thermosiphoning solar collector 650 is positioned on the south facing surface of a structure 410, assuming the structure is located in the northern hemisphere. As an alternative, the structure may also be located on the south facing roof as opposed to the outside of a wall. The thermosiphoning structure may be one similar to that shown in FIG. 22 thru 24 wherein a tubing of dark color which may be positioned along the interior of a metal surface or within a clear tube and utilize a dark interior colored tube, is positioned along the vertical surface of the south facing wall of structure 410. The thermosiphoning collector 650 is disposed on a south facing surface and the flow of thermal fluid is directed about the perimeter of building 410. The thermal fluid is heated along the south facing wall, passes through the perimeter of the building 410 and then to the thermal transfer zones Z beneath the building structure and interior of the insulated perimeter 430. Finally the fluid returns to the collector 650 to complete the fluid cycle.

Referring now to FIG. 26, a seasonally self-shading solar glazing 700 is depicted for collecting solar energy, for example in the collector 650 in FIG. 25. The collector 650 may be integrated into the wall or may be overlying the wall of the building structure as shown in FIG. 25. The solar glazing 700 may be formed of polycarbonate cells 702 having a light colored or reflective surface material 704 between the opposed polycarbonate layered structures 706, 708. The surface material 704 may be horizontal or may be angled between the layers 706, 708. The angled material 704 may be formed at a desired angle to allow winter sun to provide heat or daylight, and potentially reflecting useful daylight into the structure while blocking direct solar gain at the higher sun angles of the summer. The self-shading glazing may be located on walls or on roof lines such as forming the glazing over the piping of the south wall thermosiphoning collector 650 depicted with respect to FIG. 25. Alternatively, the collector piping may be formed, such as by molding, to pass through the solar glazing 700.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A geosolar temperature control building construction system wherein a wall defines a temperature delivery system, comprising:
 a building envelope including a wall formed of at least one of concrete, metal or wood;
 a footer positioned beneath said building envelope and at least one concrete foundation wall extending from said footer to an upper elevation;
 said building envelope further extending from said upper elevation of said concrete foundation wall;
 said concrete foundation wall having insulation on at least an outwardly facing surface, said concrete foundation wall having a first portion positioned at a first elevation relative to the earth, said first elevation being below a grade where said building construction is located;
 an insulated perimeter having a first portion extending from one of said concrete foundation wall and said footer, said first portion of said insulated perimeter extending downward and having a horizontal component extending a first preselected distance and having a vertical component extending a second preselected distance;
 an active thermal transfer system comprising a closed loop piping system having at least a plurality of horizontally extending pipes disposed beneath a lowermost floor, said plurality of horizontally extending pipes further extending upwardly along said envelope formed of said at least one of concrete metal or wood;
 a first thermal transfer liquid passing through said closed loop piping system, said first thermal transfer fluid receiving thermal energy in said horizontally extending pipes beneath said lowermost floor from at least one temperature controlled zone and actively transferring said thermal energy through said building envelope to an interior of said building;
 said wall having a plurality of uninsulated surfaces adjacent an inside surface of said wall within said building, said closed loop piping of said active thermal transfer system disposed adjacent said uninsulated surfaces to transfer thermal energy into or out of the building and control interior building temperature; and,
 a geosolar thermal transfer system comprising a solar collector and at least one solar recharge loop, said geosolar thermal transfer system one of: (a) receiving solar energy for storage in the earth beneath said lowermost floor of said building downward and within a perimeter of said insulated perimeter or (b) discharging thermal energy from the ground to atmosphere to create said at least one temperature controlled zone in the earth beneath a lowermost position of said building and downward and within a perimeter of said insulated perimeter.

2. The geosolar temperature control building construction of claim 1, said closed loop piping of said active thermal transfer system extending along a roof of said building.

3. The geosolar temperature control building construction of claim 1, further comprising a plurality of temperature controlled zones beneath said building construction.

4. The geosolar temperature control building construction of claim 3, wherein a first of said plurality of zones is vertically above a second of said plurality of zones.

5. The geosolar temperature control building construction of claim 4 wherein said first zone is a heating zone and said second zone is a cooling zone.

6. The geosolar temperature control building construction of claim 5 wherein said cooling zone is at least partially below an elevation of a groundwater table.

7. The geosolar temperature control building construction of claim 1 further comprising a vertical divider to define horizontally opposed zones of heating and cooling.

8. The geosolar temperature control building construction of claim 1 further comprising vertically opposed zones of heating and cooling.

9. The geosolar temperature control building construction of claim 1 wherein said geosolar thermal transfer system discharges thermal energy from the earth in the area adjacent said recharge loop at least in the winter season.

10. The geosolar temperature control building construction of claim 1 wherein said geosolar thermal transfer system charges thermal energy in the earth in the area adjacent said recharge loop at least in the summer season.

11. The geosolar temperature control building construction of claim 1 wherein the insulated perimeter is formed of insulation board.

12. The geosolar temperature control building construction of claim 11 wherein a first portion of said insulated perimeter being angled downwardly wherein said horizontal component is greater than a vertical component.

13. The geosolar temperature control building construction of claim 11 wherein a first portion is one of horizontal or sloping.

14. The geosolar temperature control building construction of claim 11 wherein a second portion is oriented vertically or angled downwardly.

15. The geosolar temperature control building construction of claim 1 wherein said wall includes one of a single stud or double stud construction.

16. The geosolar temperature control building construction of claim 15, wherein said one of a single or double stud construction is one of metal or wood.

17. The geosolar temperature control building construction of claim 15 further comprising clips for spacing said closed loop piping from said wall.

18. The geosolar temperature control building construction of claim 17 further comprising a spring within said clip to retain said closed loop piping.

19. The geosolar temperature control building construction of claim 1 further comprising a radiant plate along an inner surface of said wall and in thermal communication with said closed loop piping.

20. The geosolar temperature control building construction of claim 1, said closed loop piping being at least partially exposed within an interior of said building.

21. The geosolar temperature control building construction of claim 1, said closed loop piping being a serpentine arrangement on at least one of an outer surface or an inner surface of a roof.

22. The geosolar temperature control building construction of claim 1, said closed loop piping being embedded within a roof line assembly.

23. The geosolar temperature control building construction of claim 1 further comprising a passive thermal transfer system comprising an inwardly facing surface of said concrete wall being free of insulation at said first elevation to expose said concrete wall to thermal conditions at said first elevation and thermally couple said building to said earth.

24. The geosolar temperature control building construction of claim 1 further comprising a thermosiphoning solar collector.

25. The geosolar temperature control building construction of claim 24, said closed loop piping disposed behind said thermosiphoning solar collector.

26. The geosolar temperature control building construction of claim 24, said closed loop piping formed in said thermosiphoning solar collector.

27. The geosolar temperature control building construction system of claim 1, said insulated perimeter further comprising a second portion extending downward a third preselected distance providing thermal isolation between a temperature controlled zone beneath the building and ground outside said insulated perimeter.

* * * * *